US012517717B2

(12) United States Patent
Joyce et al.

(10) Patent No.: US 12,517,717 B2
(45) Date of Patent: Jan. 6, 2026

(54) AUTOMATED MODIFICATION OF COMPUTER PROGRAMS

(71) Applicant: Ab Initio Technology LLC, Lexington, MA (US)

(72) Inventors: John Joyce, Newton, MA (US); Marshall A. Isman, Newton, MA (US); Edward Alan Bach, Melrose, MA (US)

(73) Assignee: Ab Initio Technology LLC, Lexington, MA (US)

( * ) Notice: Subject to any disclaimer, the term of this patent is extended or adjusted under 35 U.S.C. 154(b) by 90 days.

(21) Appl. No.: 17/704,469

(22) Filed: Mar. 25, 2022

(65) Prior Publication Data
US 2023/0112179 A1    Apr. 13, 2023

Related U.S. Application Data

(60) Provisional application No. 63/253,851, filed on Oct. 8, 2021.

(51) Int. Cl.
*G06F 8/65*        (2018.01)
*G06F 16/27*       (2019.01)
(Continued)

(52) U.S. Cl.
CPC ............... *G06F 8/65* (2013.01); *G06F 16/27* (2019.01); *H04L 67/06* (2013.01); *H04L 67/34* (2013.01)

(58) Field of Classification Search
CPC .......... G06F 8/65; G06F 16/2379; G06F 8/75; H04L 67/06; H04L 67/34
See application file for complete search history.

(56) References Cited

U.S. PATENT DOCUMENTS

| 5,303,379 A | 4/1994 | Khoyi et al. |
| 5,966,072 A | 10/1999 | Stanfill et al. |

(Continued)

FOREIGN PATENT DOCUMENTS

| CN | 102855495 | 6/2015 |
| CN | 108009497 | 5/2018 |

(Continued)

OTHER PUBLICATIONS

International Search Report and Written Opinion in International Appln. No. PCT/US2022/077666, mailed on Apr. 11, 2023, 20 pages.

(Continued)

*Primary Examiner* — S. Sough
*Assistant Examiner* — Cheneca Smith
(74) *Attorney, Agent, or Firm* — Fish & Richardson P.C.

(57) ABSTRACT

A method for updating a computer program includes receiving a program hosted on and configured to be executed by a first computing system. The program is analyzed to obtain characterization of the program's lineage, architecture, and operation. Lineage includes relationships among elements of the program, architecture includes a characteristic of the data source, the data target, and processors configured to process the data contained in data records, and operation includes processes that are executed to process the data from the data records. A characterization is received of an update to be made to the program; when the program is modified according to the update, at least some of the modified program is configured to be hosted on and executed by a second computing system. The program is modified to implement the update to generate the modified program.

31 Claims, 14 Drawing Sheets

(51) Int. Cl.
*H04L 67/00* (2022.01)
*H04L 67/06* (2022.01)

(56) References Cited

U.S. PATENT DOCUMENTS

| | | | |
|---|---|---|---|
| 5,974,254 A | 10/1999 | Hsu | |
| 7,085,779 B2 | 8/2006 | Holtz et al. | |
| 7,139,837 B1 | 11/2006 | Parekh et al. | |
| 7,165,248 B2 | 1/2007 | Holtz et al. | |
| 7,506,304 B2 | 3/2009 | Morrow | |
| 8,151,244 B2 | 4/2012 | Hsu et al. | |
| 8,583,613 B2 | 11/2013 | Liu et al. | |
| 9,063,742 B1 | 6/2015 | Bienkowski et al. | |
| 9,298,453 B2* | 3/2016 | Vangala | G06F 8/75 |
| 9,442,707 B2 | 9/2016 | Sathyanathan et al. | |
| 9,471,304 B1 | 10/2016 | Fuchs | |
| 9,692,632 B2 | 6/2017 | Bhattacharya et al. | |
| 9,736,013 B2 | 8/2017 | Markley et al. | |
| 9,785,419 B2 | 10/2017 | Stanfill et al. | |
| 9,860,063 B2* | 1/2018 | Manchepalli | H04L 9/14 |
| 9,880,818 B2 | 1/2018 | Isman et al. | |
| 9,996,342 B2 | 6/2018 | Mak et al. | |
| 10,055,333 B2 | 8/2018 | Offner et al. | |
| 10,152,406 B2 | 12/2018 | Yoshida et al. | |
| 10,175,951 B2 | 1/2019 | Stanfill et al. | |
| 10,180,821 B2 | 1/2019 | Larson et al. | |
| 10,249,014 B2 | 4/2019 | Bala et al. | |
| 10,303,469 B1 | 5/2019 | Neatherway et al. | |
| 10,318,283 B2 | 6/2019 | Bach et al. | |
| 10,802,945 B2 | 10/2020 | Rozenberg et al. | |
| 10,990,364 B2 | 4/2021 | Bach et al. | |
| 11,385,892 B1* | 7/2022 | Zhang | G06F 16/9535 |
| 11,422,797 B1* | 8/2022 | Zhang | G06F 8/72 |
| 2003/0084425 A1 | 5/2003 | Glaser | |
| 2004/0034696 A1 | 2/2004 | Joffrain et al. | |
| 2005/0257221 A1 | 11/2005 | Inchingolo et al. | |
| 2006/0059144 A1 | 3/2006 | Canright et al. | |
| 2006/0190105 A1 | 8/2006 | Hsu et al. | |
| 2007/0006152 A1 | 1/2007 | Ahmed et al. | |
| 2007/0011668 A1 | 1/2007 | Wholey et al. | |
| 2007/0283321 A1 | 12/2007 | Hegde | |
| 2008/0168071 A1 | 7/2008 | Dykes et al. | |
| 2009/0055445 A1 | 2/2009 | Liu et al. | |
| 2009/0100415 A1* | 4/2009 | Dor | G06F 8/71 717/131 |
| 2010/0205588 A1 | 8/2010 | Yu et al. | |
| 2011/0016354 A1 | 1/2011 | Douros et al. | |
| 2011/0145650 A1 | 6/2011 | Krauss | |
| 2011/0258611 A1 | 10/2011 | Dutta et al. | |
| 2013/0157579 A1 | 6/2013 | Horton et al. | |
| 2013/0219057 A1 | 8/2013 | Li et al. | |
| 2014/0149494 A1 | 5/2014 | Markley et al. | |
| 2014/0149591 A1 | 5/2014 | Bhattacharya et al. | |
| 2014/0237447 A1 | 8/2014 | Santos | |
| 2015/0286192 A1 | 10/2015 | Morrow | |
| 2015/0347600 A1 | 12/2015 | Tabe | |
| 2016/0019057 A1 | 1/2016 | Bach et al. | |
| 2016/0162363 A1 | 6/2016 | Letkeman | |
| 2017/0228411 A1 | 8/2017 | Cadarette | |
| 2018/0157579 A1 | 6/2018 | Rozenberg et al. | |
| 2018/0336020 A1 | 11/2018 | Berg et al. | |
| 2019/0303135 A1 | 10/2019 | Li et al. | |
| 2019/0377558 A1 | 12/2019 | Bach et al. | |
| 2020/0371781 A1 | 11/2020 | Joyce et al. | |
| 2020/0380212 A1 | 12/2020 | Butler et al. | |
| 2021/0216290 A1 | 7/2021 | Bach et al. | |
| 2021/0263734 A1 | 8/2021 | Joyce et al. | |

FOREIGN PATENT DOCUMENTS

| | | |
|---|---|---|
| CN | 109597459 | 4/2019 |
| JP | H10-177477 | 6/1998 |

OTHER PUBLICATIONS

Dullien et al., "Graph-based comparison of Executable Objects," Jan. 2005, 13 pages.
Pro Git, "Apress," Chapter 3, Aug. 26, 2009, 31 pages.
Taentzer et al., "A Fundamental approach to model versioning based on graph modifications: from theory to implementation, " Software Systems and Modeling, Feb. 2014, 13(1):239-272.
Voss et al., "Automated Dataflow Graph Merging, " Maxeler Technologies Ltd, Jul. 2016, 8 pages.
Wingerd, "Convergence vs. Divergence Convergence vs. Divergence Purposeful Merging with Perforce", European User Conference, Sep. 2006, 24 pages.

* cited by examiner

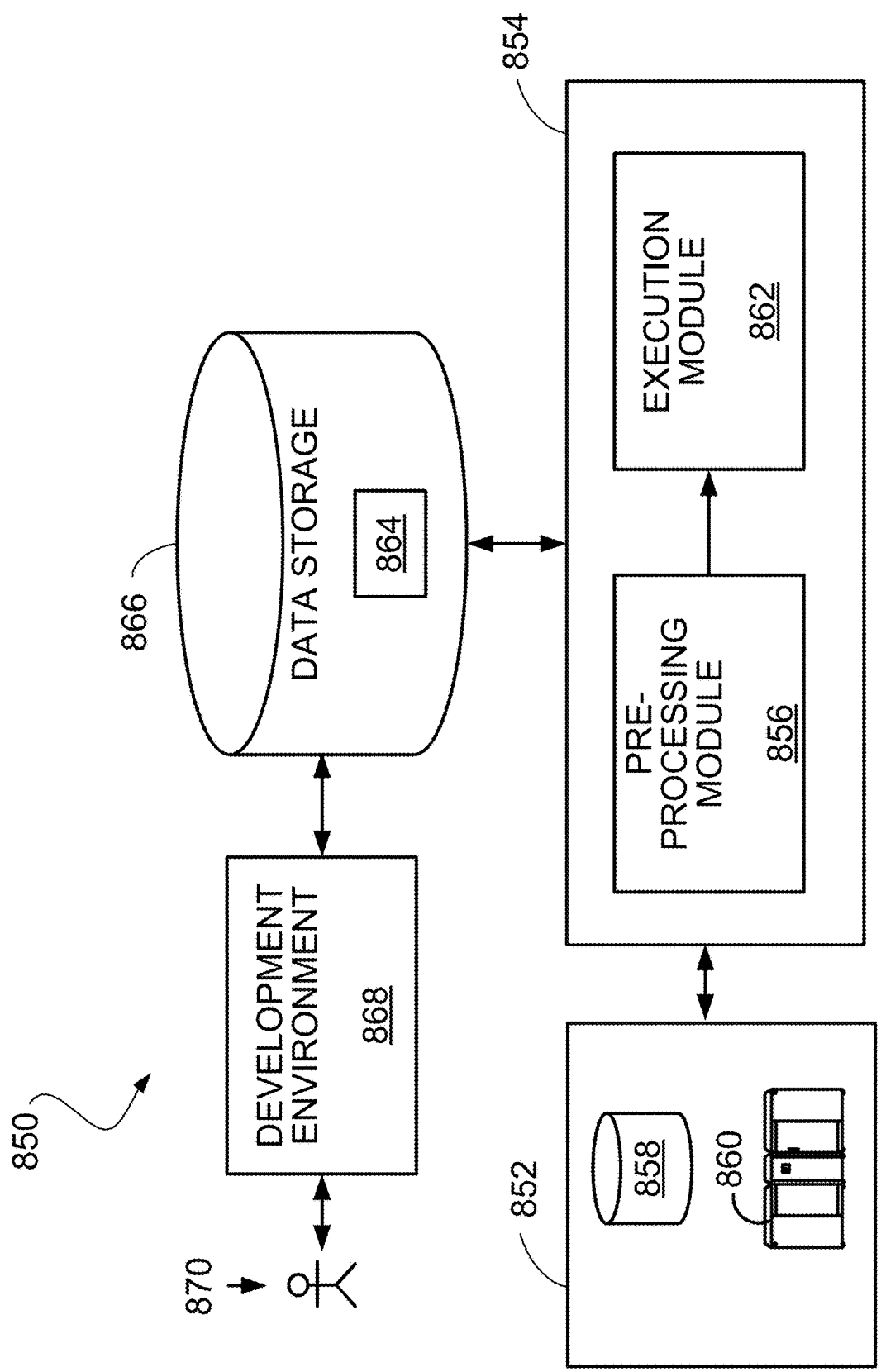

AUTOMATED MODIFICATION OF COMPUTER PROGRAMS

CLAIM OF PRIORITY

This application claims priority under 35 U.S.C. § 119(e) to U.S. Patent Application Ser. No. 63/253,851, filed on Oct. 8, 2021, the entire contents of which are hereby incorporated by reference.

BACKGROUND

Data processing systems can include multiple computer programs that are executable to process data contained in input data records. Within a data processing system, data records can be passed from one computer program to another, resulting in a set of output data records containing processed data.

SUMMARY

In an aspect, a method for updating a computer program includes receiving a computer program hosted on and configured to be executed by a first computing system, in which the computer program is configured to, when executed, receive data records from a data source, process data contained in fields of the data records, and output processed data records to a data target. The method includes analyzing the computer program by one or more processors to obtain characterization of a lineage, an architecture, and an operation of the computer program. The lineage of a computer program includes relationships among elements of the computer program, the architecture of a computer program includes a characteristic of the data source, a characteristic of the data target, and a characteristic of one or more processors configured to process the data contained in data records, and the operation of a computer program includes processes of the computer program that are executed to process the data from the data records. The method includes receiving a characterization of an update to be made to the computer program, in which when the computer program is modified according to the update, at least some of the modified computer program is configured to be hosted on and executed by a second computing system; and modifying the computer program to implement the update to generate the modified computer program, including modifying one or more of the lineage of the computer program, architecture of the computer program, or the operation of the computer program.

Embodiments can include one or any combination of two or more of the following features.

The second computing system is a cloud based system.

Modifying the computer program includes merging the characterization of the update with the characterization of the lineage, the architecture, and the operation of the computer program.

The lineage of the computer program includes relationships between the computer program and other computer programs.

The computer program includes data processing components configured to process values in fields of data records, the data processing components being connected by links representative of flows of data records. In some cases, modifying the computer program includes modifying a value or an expression for a parameter of a data processing component or a link of the computer program. In some cases, modifying the computer program includes adding a new data processing component, deleting a data processing component, or both. In some cases, modifying the computer program includes adding a new link, deleting a link, or both.

The characterization of the update includes an characterization of a distributed processing scheme for at least a portion of the computer program. In some cases, modifying the computer program includes modifying a layout of the computer program to implement a distribution of processing operations according to the distributed processing scheme. In some cases, modifying the computer program includes: generating a specification for a first new data processing component configured to implement a partitioning operation; generating a specification for a second new data processing component configured to implement a gathering operation; inserting the first new data processing component into the computer program upstream of the at least a portion of the computer program; and inserting the second new data processing component into the computer program downstream of the at least a portion of the computer program. In some cases, the method includes identifying components of the computer program to which the distributed processing scheme is to apply based on the characterization of the update.

The data source includes a first file system or database, and in which the characterization of the update to be made to the computer program includes an identification of a second file system or database from which the modified computer program is to receive data records. In some cases, modifying the computer program includes updating a name of the data source in a specification of a component of the computer program. In some cases, modifying the computer program includes: deleting a first data source component of the computer program corresponding to the first file system or database; and inserting a second data source component corresponding to the second file system or database.

The data target includes a first file system or database, and in which the characterization of the update to be made to the computer program includes an identification of a set of multiple second file systems or databases to which the modified computer program is to output data records. In some cases, at least one of the second file systems or databases is in a location different from a location of at least one other of the second file systems or databases. In some cases, modifying the computer program includes: replicating a flow in the computer program that connects a data processing component of computer program to a first data target component corresponding to the first file system or database; inserting a new component corresponding to a first one of the second file systems or databases, in which the replicated flow connects the data processing component to the new component. In some cases, the second file system or database is a cloud-based file system or database, and in which the characterization of the update includes an identification of a first characteristic of data to be stored in a non-cloud-based storage location, an identification of a second characteristic of data to be stored in the second, cloud-based file system or database, or both. In some cases, analyzing the computer program includes conducting a data lineage analysis, and comprising identifying, based on the data lineage analysis, a first component that is configured to receive or output data records having the first characteristic, a second component that is configured to receive or output data records having the second characteristic, or both. In some cases, the first characteristic comprises personally identifiable information (PII). In some cases, modifying the computer program includes modifying a specification for a first data processing component that outputs data having the first characteristic, modifying a specification for a second data processing component that outputs data having the second characteristic or both.

Modifying the computer program includes: identifying a data processing component of the computer program that implements a first type of file transfer protocol; and modifying a specification for the data processing component according to a second type of file transfer protocol, in which the characterization of the update includes an indication of a change from the first type of file transfer protocol to the second type of file transfer protocol. In some cases, modifying the specification for the data processing component includes changing a value or expression for each of one or more parameters of the data processing component.

The characterization of the update includes a requirement for anonymization of personally identifiable information (PII). In some cases, analyzing the computer program includes identifying a data processing component that is configured to receive first data records having one or more fields containing PII. In some cases, modifying the computer program includes adding a component configured to implement a tokenization service upstream of the identified data processing component, the tokenization service being configured to receive the first data records and genericize the PII contained in the fields of the received records. In some cases, modifying the computer program includes modifying a specification of the identified data processing component to change a definition of a record format for data records to be processed by the identified data processing component. In some cases, the second computing system is a cloud-based computing system, and in which modifying the computer program includes specifying a non-cloud-based computing system for execution of the tokenization service.

The method includes testing at least a portion of the modified computer program, the testing including: providing input test data records to the at least a portion of the modified computer program; and obtaining first processed data records from the at least a portion of the modified computer program. In some cases, the method includes testing at least a portion of the computer program, in which the at least a portion of the computer program corresponds to the tested portion of the modified computer program, in which testing the at least a portion of the computer program includes: providing the input test data records to the at least a portion of the computer program, and obtaining second processed data records from the at least a portion of the computer program; in which testing the at least a portion of the modified computer program includes comparing the first processed data records and the second processed data records.

The method includes migrating the modified computer program to the second computing system.

Modifying the computer program includes: identifying a data processing component of the computer program that has an attribute value that matches a target attribute value indicated by the characterization of the update; and replacing the identified data processing component with a new data processing component. In some cases, identifying a data processing component of the computer program that has an attribute value that matches a target attribute value indicated by the characterization of the update includes: generating a first set of data records, including generating a data record corresponding to each data processing component of the computer program, in which each data record contains an identifier of the respective data processing component and attribute values for attributes of the respective data processing component; and filtering the first set of data records based on the attribute values contained in the data records of the first set to obtain a second set of data records, including removing, by the filtering, the data records of the first set that do not contain a value for the particular attribute that matches the target attribute value indicated by the characterization of the update.

The modifying of the computer program to implement the update to generate the modified computer program, includes at least modifying the architecture of the computer program.

The modifying of the architecture includes at least adapting the characteristic of one or more processors configured to process the data contained in the data records to characteristics of one or more processors of the second computing system.

The received computer program is a copy of a computer program hosted on and executable by the first computing system.

The modifying of the computer program includes generating a copy of the received computer program and modifying the generated copy to generate the modified computer program.

The modifying of the one or more of the lineage of the computer program, architecture of the computer program, or the operation of the computer program is performed while taking into account characteristics of the second computing system. The characteristics of the second computing system taken into account are characteristics of the hardware to be used by the second computing system for executing the modified computer program.

The second computing system is a cloud-based computing system, and modifying the computer program includes adding a component configured to be executed on a local computer system and to implement a tokenization service that is configured to anonymize PII contained in the fields of records received from the data source, preferably by substituting a token for the PII and the token maps back to the PII through a tokenization system but ensures that the PII itself is not provided to the cloud-based system where other processing operations of the modified computer program are to occur.

Each of the operations of the method are automatically executed by the computing system implementing the method.

The computing system implementing the method is a program update system that is different from each of the first computing system and second computing system, and/or wherein the second computing system is different from the first computing system.

In an aspect, a method for updating a dataflow graph includes accessing a dataflow graph, in which a specification of the dataflow graph defines nodes, at least one of the nodes representing a data processing component defining an operation to be performed to process data in one or more fields of a data record having a record format, the data records being provided to the data processing component, and one or more links connecting the nodes and each representing a flow of data records. The method includes generating a first set of data records representative of the dataflow graph, including generating a data record corresponding to each of the data processing components of the dataflow graph, each data record containing: an identifier of the data processing component, and attribute values for attributes of the data processing component. The method includes receiving a characterization of an update to the dataflow graph, the characterization of the update indicative of a target value for a particular attribute; filtering the first set of data records based on the target value indicated by the characterization of the update to obtain a second set of data records, including removing, by the filtering, data records that do not contain an attribute value for the particular attribute that matches the target value indicated by the characterization of the update; and for each data record in the second set of data records, replacing the corresponding component with a new component indicated by the characterization of the update.

Embodiments can include one or both of the following features.

Replacing a given component with a new component comprises updating the flows connected to the given component.

Replacing a given component with a new component comprises deleting the flows connected to the node representing the given component and generating new flows connected to the node representing the new component.

Aspects as described herein allow for automatic modification of a computer program that is to be migrated to a new computing system that is different from the computing system on which the computer program was originally hosted and configured to be executed. To make this computer program ready for migration to the new computing system and ready for its execution by the new computing system, the automatic modification of the computer program takes into account characteristics of the new computing system to ensure the proper operation of the modified computer program at the new computing system, such as proper operation in terms of data security, throughput of data processing, computing resource consumption or correct execution of the processes/functions of the computer program. The characteristics of the new computing system taken into account when modifying the computer program can involve characteristics relating to the hardware of the new computing system and/or to the degree of data protection at the new computing system (data security). These aspects are especially beneficial, but not limited to, migrating a computer program from a local computing system to cloud-based computing system. The details of one or more implementations are set forth in the accompanying drawings and the description below. Other features and advantages will be apparent from the description and drawings, and from the claims.

BRIEF DESCRIPTION OF DRAWINGS

FIG. 13 is a diagram of a computing system.

DETAILED DESCRIPTION

We describe here approaches, preferably automated approaches, to modifying a computer program, such as a dataflow graph (other types of programs are also possible), e.g., such that at least a portion of the modified computer program can be hosted on and executed by a different computing system than that of the original computer program. For instance, the modification can configure the modified computer program to be hosted on and executed by a cloud-based computing system. The automated modification process involves an automated analysis of the computer program to characterize the lineage, architecture, and operation of the computer program. One or more of the lineage, architecture, and operation are then automatically modified to implement an update, such as an update specified by a user or a computing system. The update can be, e.g., the introduction of a distributed processing scheme into the modified computer program, the modification of a location for retrieval of input data records or storage of output data records, or the introduction of a process to mask personally identifiable information (PII), e.g., to comply with privacy regulations.

Figure 1:
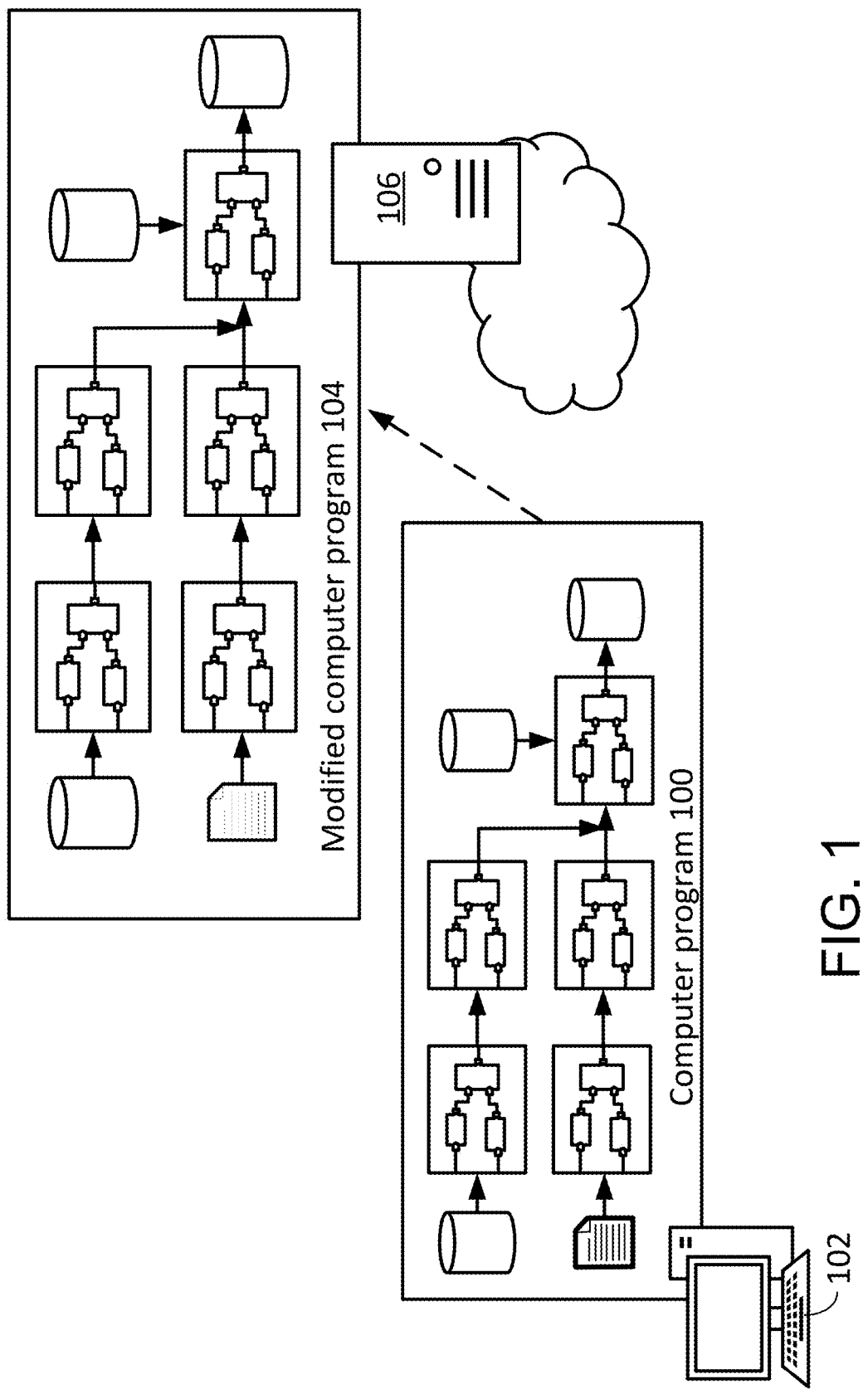
FIG. 1 is a diagram of computer programs.

Referring to FIG. 1, a computer program 100 is hosted on and executed by a first computing system 102. In an example, the first computing system 102 is a computing system that is local to a user operating the computer program, e.g., a computing system located on-site at an office. The user, such as a systems engineer, may want to update the computer program 100 such that at least a portion of a modified version of the computer program (referred to as a modified computer program 104) is hosted on and executed by a second computing system 106, e.g., a cloud computing system. For instance, the updating of the computer program 100 can be performed as part of a process to migrate applications or processes from a local environment (e.g., local storage and execution) to a cloud-based environment (e.g., cloud-based storage and/or execution), or to a combination of a local environment and a cloud-based environment. The updating of the computer program 100 to generate the modified computer program 104 is an automated process based on input from the user characterizing the objective of the update, as described in the following paragraphs.

The computer program 100 is analyzed automatically to obtain various characterizations of the computer program. For instance, the computer program 100 can be analyzed to obtain a characterization of a lineage of the computer program 100, which includes relationships among elements of the computer program, relationships between the computer program and other computer programs, or both. The characterization of the lineage of a computer program includes data indicative of those relationships. An element may be a data processing node or component, a data resource or data target, a link for dataflow, or the like. The computer program 100 can be analyzed to obtain a characterization of an architecture of the computer program, which includes characteristics of a data source, characteristics of a data target, characteristics of one or more processors that are configured to execute the computer program (e.g., to process data contained in fields of the data records), or other features of the computer program architecture. The characterization of the architecture of a computer program includes data indicative of those characteristics. The computer program 100 can be analyzed to obtain a characterization of an operation of the computer program, which includes processes of the computer program that are executed when the computer program is executed, e.g., processes that are executed to process data contained in fields of data records received by the computer program. The characterization of the operation of a computer program includes data indicative of those processes.

A characterization of an update to the computer program 100 is received, e.g., as input from a user. The update is an update that, when implemented, e.g. when the computer program 100 is modified according to the update, results in the modified computer program 104, at least some of which is configured to be hosted on and executed by the second computing system 106. The computer program 100 can be modified automatically to implement the update, thereby generating the modified computer program 104. Implementing the update includes one or more of modifying the lineage of the computer program, modifying the architecture of the computer program, or modifying the operation of the computer program. The modified computer program 104 is, at least in part, hosted on and configured to be executed by the second computing system 106.

The computer program 100 and modified computer program 104 are computer programs that, when executed, receive data records from a data source, process data contained in fields of the data records, and output processed data to a data target. In some examples, the computer program 100 and modified computer program 104 are executable dataflow graphs. An executable dataflow graph is a computer program in the form of a graph that includes nodes, which are executable data processing components and data resources such as data sources and data targets. Nodes can receive data records within the graph, process data contained in the data records, such as values in fields of the data records, and output results of the processing in data records, which are forwarded to a destination within the graph, such as a data resource, e.g. data target. Data resources are repositories of data, such as data records, e.g., sources of data to be processed or used during execution of the dataflow graph or destinations (targets) for processed data records output by the dataflow graph. Data resources are, for example, files, databases (e.g., tables of databases), queues, objects, or other types of data sources or targets. A link connecting two nodes of a graph is provided for a flow of information and/or data, such as data records, between the nodes. The executable dataflow graph is configurable to, when executed, process data contained in fields of data records. Dataflow graphs (sometimes referred to as graphs) can be data processing graphs or plans that control execution of one or more graphs. In some examples, one or more data processing components of a dataflow graph is a sub-graph.

Figure 2:
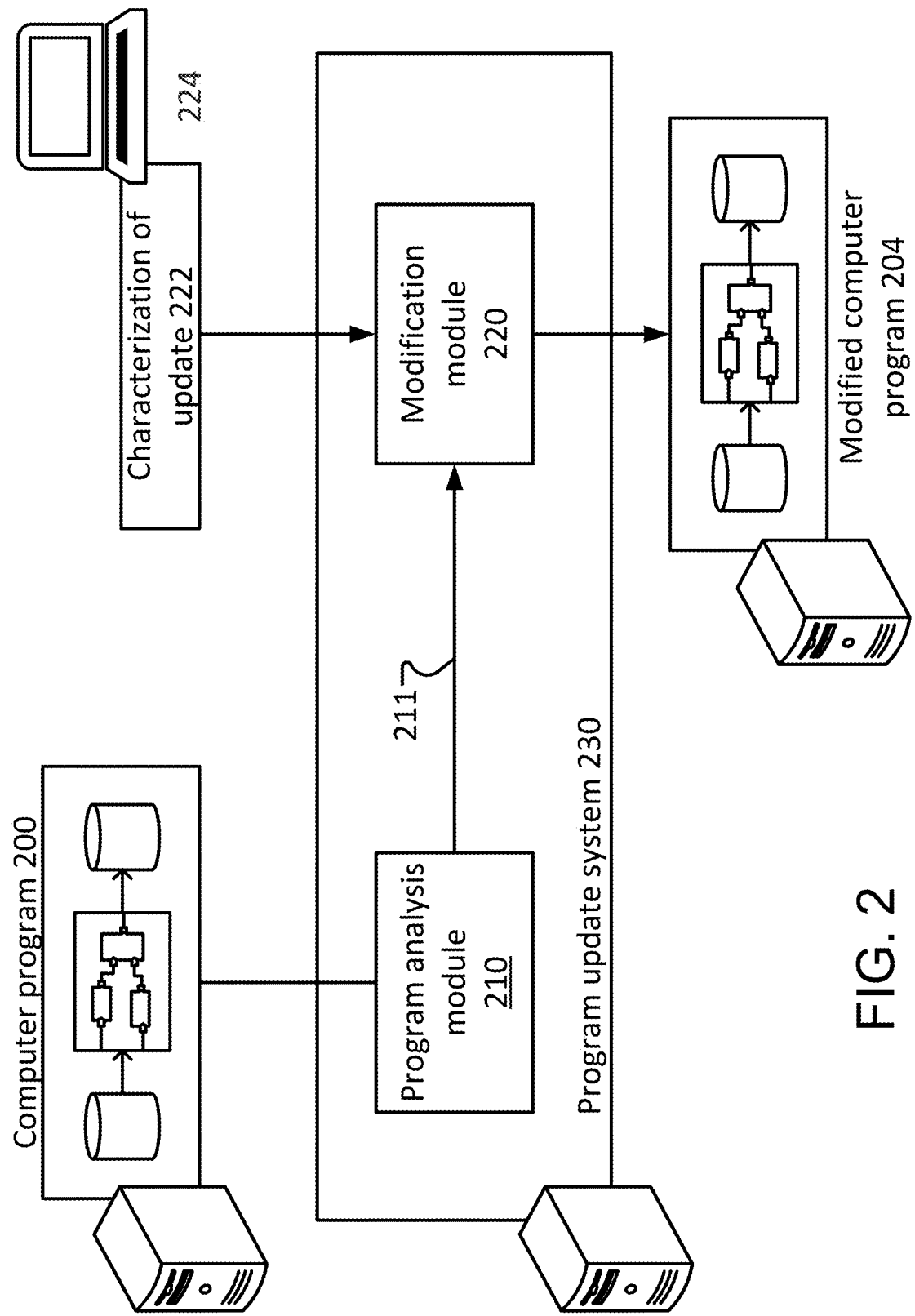
FIG. 2 is a diagram of a system for updating a computer program.

FIG. 2 is a schematic diagram of a computing system 230 for updating a computer program 200 to generate a modified computer program 204. The computing system 230 includes one or more processors and memory. The computer programs 200, 204 are, e.g., executable dataflow graphs that are configurable to process data contained in fields of data records. The original computer program 200 is hosted on and executed by a first computing system 201, such as a computing system that is local to a business or entity with an interest in the computer program 200. The modified computer program 204 is hosted on and executed by a second computing system 203, such as a cloud-based computing system, that is different from the first computing system 201. In some examples, portions of the modified computer program 204 are hosted on and/or executed by the first computing system 201 and other portions are hosted on and/or executed by the second computing system 203.

The system 230 receives a copy of program 200 from system 201 or the system 230 receives the program 200 that is configured to be hosted on system 201. The system 230 includes a program analysis module 210 that analyzes the received (copy of) computer program 200 to obtain a characterization of a lineage of the computer program 200, an architecture of the computer program 200, an operation of the computer program 200, or a combination of any two or more of them. This characterization 211 is passed to a modification module 220.

The lineage of the computer program 200 includes relationships among elements of the computer program (e.g., relationships among nodes, data resources, or both), relationships between the computer program and other computer programs, or both. The lineage of the computer program 200 can identify or be based on static dependencies, runtime dependencies, or both. A static dependency between two elements or programs is a dependency that is defined by values in previously stored parameter sets associated with the computer program(s). Static dependencies among elements of the computer program or between computer programs are identified by a static analysis of the values in the stored parameter sets. A runtime dependency between two elements or computer programs is a dependency that is defined at runtime of one of the computer programs but that is not apparent from the static analysis. When the computer program 200 is executed to process data records, an execution command can include parameter values, e.g., in addition to or instead of parameter values in the previously stored parameter sets that define the static dependencies. Runtime logs generated during execution of the computer program indicate these parameter values, which indicate, e.g., which nodes were executed or which data resources were accessed. Runtime dependencies among elements of the computer program or between computer programs are identified by an analysis of the parameter values indicated in the runtime logs.

Further description of static and runtime analysis can be found in U.S. Patent Application Publication No. 2016/0019057 and U.S. Patent Application Publication No. 2016/0019057, the contents of both of which are incorporated here by reference in their entirety.

The architecture of the computer program 200 includes characteristics of a data source, characteristics of a data target, characteristics of one or more processors that are configured to execute the computer program (e.g., to process data contained in fields of the data records), or other features of the computer program architecture. The characterization of a data source or data target can include a name of the data source or data target, a type of the data source or data target (e.g., database, file, queue, etc.), an actual location of the data source or data target (e.g., a path for a physical file or data set), or a parameterized location of the data source or data target. A parameterized location is an expression that, at run time of the computer program, resolves to a path for the actual data source or data target, e.g., a path for a physical file or data set. For instance, a dataset, such as a data source or data target, can be characterized by the parameterized path /${FEED}/inv_${DATE}.dat. Upon execution, the computer program receives values for the FEED and DATE parameters such that the parameterized path can be resolved to a specific physical location. The characterization can include an identification or indication of multiple data sources or data targets, e.g., local and/or cloud-based data sources or data targets. The characterization of the one or more processors can include a number of processors, a layout for a distributed processing scheme (e.g., an indication of a partitioning scheme for processing operations), a location of each of the one or more processors, a target or actual power consumption for each of the one or more processors, or other characteristics.

The operation of the computer program 200 includes processes of the computer program that are executed when the computer program is executed, e.g., processes that are executed to process data contained in fields of the data records. Processes of the computer program can include, e.g., file transfer operations, sort operations, filter operations, join operations, and other appropriate operations.

The system 230 includes a modification module 220 that receives a characterization of an update 222 to be made to the computer program 200. The characterization of the update 222 can be received from a user via a user interface 224, e.g., a program development interface. An update is a modification to be made to the computer program 200 such that, when the computer program 200 is modified according to the update to generate the modified computer program 204, at least some of the modified computer program 204 is configured to be hosted on and executed by the second computing system 203. Examples of characterizations of an update include one or more of the following:

- A characterization of a distributed processing scheme to be implemented for at least a portion of the modified computer program, e.g., a characterization of a partitioning (e.g., a change in width of processing operations for at least a portion of the modified computer program or a change in a rule by which data records are partitioned onto each of multiple processing streams (e.g., a change from partitioning based on customer number to partitioning based on product number),
- A change in the data source, data target, or both for the modified computer program 204, e.g., an identification of one or more data sources or data targets that differ from the data source(s) or data target(s), respectively, for the computer program 200; or a change in the number of data source(s), data target(s), or both (e.g., a change from a local data target to a cloud-based data target or to a combination of local and cloud-based data targets),
- A change in a type of file transfer protocol to be implemented by the modified computer program, e.g., a change from a traditional File Transfer Protocol (FTP) to a Secure File Transfer Protocol (SFTP), or
- An introduction of a requirement to mask personally identifiable information (PII) in data records received or processed by the modified computer program 204.

The modification module 220 implements the update 222 by joining the update 222 with the characterizations 211 of the computer program 200 and applying the result to the computer program 200, thereby generating the modified computer program 204. Modifying the computer program 200 includes modifying the lineage of the computer program 200, the architecture of the computer program, the operation of the computer program 200, or a combination of any two or more of them. In some examples, modifying the computer program 200 includes directly modifying the computer program 200 itself to generate the modified computer program 204. In some examples, modifying the computer program includes generating a copy of the computer program 200 and modifying the copy to generate the modified computer program 204.

When the computer program 200 is a dataflow graph, the modifications can include modifying a value or expression for a parameter of a data processing component or a link of the dataflow graph. The modifications can include adding a new data processing component or link, deleting a data processing component or link, or combinations thereof, such as to account for characteristics of system 203 (e.g., hardware characteristics). For instance, to replace a first data processing component in the computer program 200 with a second data processing component, the first data processing component and its associated links are deleted, and a new data processing component and appropriate links are added.

In some examples, the modification module 220 automatically identifies the component(s) of the computer program 200 that are to be modified and implements the update upon receipt of the characterization of the update from the user. For instance, the characterization of the update 222 can identify a characteristic of components in the original computer program 200 that are to be modified, and can specify how the component satisfying that characteristic are to be modified. The modification module 220, based on the characterizations 211 of the computer program 200, implements a search-and-replace process, described in further detail below, to identify the components satisfying the characteristic and to replace those identified components with replacement components having been modified accordingly. In a specific example, the characterization of update indicates that all data targets in the original computer program 200 having a certain location parameter (e.g., a path to a local data storage location) are to be modified to have a different location parameter (e.g., a path to a cloud-based data storage location). The modification module 222 searches for all data target components with the specified location parameter and replaces them with data target components having the different location parameter.

In some examples, the characterization of the update 222 provided by the user provides an identification or indication of the components that are to be modified or affected by the modification, and the modification module 220 implements the update for those components. For instance, the characterization of the update 222 can identify a set of processes and can specify how that set of processes is to be modified. Based on the characterizations 211 of the computer program 200, the modification module 220 can identify the components that are to be updated. In a specific example, the characterization of the update includes an identification of a set of processes that are to be executed according to a distributed processing scheme in the modified computer program. The modification module 220, based on the characterizations 211 of the architecture and operation of the computer program 200, identifies the components that correspond to those processes and inserts a partition component upstream of the components identified by the user and a gather component downstream of the components identified by the user, as discussed in more detail below.

In some examples, the characterization of the update 222 can stipulate that any personally identifiable information (PII) be anonymized in a tokenization process prior to being provided to the second computer system 203, such as to account for a less protective data security environment at system 203. The tokenization process may result in a change in format, e.g., from a numeric format of the PII to an alphanumeric format for the resulting token. The modification module 220, based on the data lineage characterization of the computer program 200, can identify components for which the record format is to be updated to account for this change in format.

Figure 3:
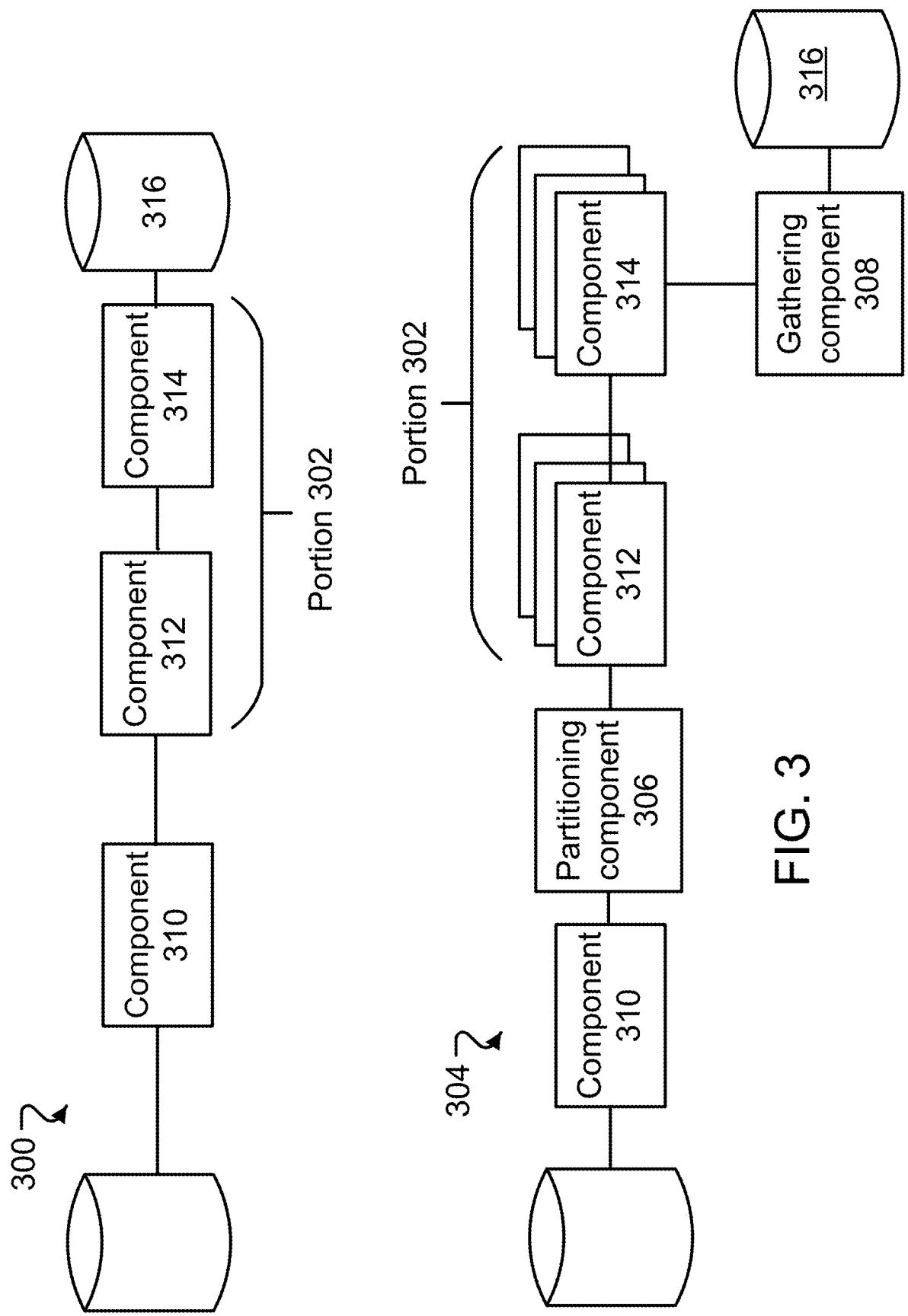
FIGS. 3-8 are diagrams of dataflow graphs.

FIG. 3 illustrates examples of a computer program 300 and a modified computer program 304. The computer program 300 does not implement a distributed processing scheme and is modified according to an update to implement a distributed processing scheme in a portion 302 of the modified computer program 304 to account for characteristics of the second computing system. A distributed processing scheme is an architecture in which multiple processors are used to execute the computer program. In some examples, the multiple processors can be located on different computing devices. For instance, one or more of the processors can be located at a local computer, such as ones in compliance with privacy regulations, and one or more other processors can be cloud-based processors. Distributed computing schemes can be used, e.g., to achieve efficient processing; to introduce elasticity and scaling ability; to achieve migration of a computer program to a cloud-based system while maintaining compliance with privacy regulations that may prohibit cloud-based processing of sensitive data such as personally identifiable information (PII), or for other reasons.

Implementation of a distributed processing scheme in the modified computer program 304 can involve modifying a layout of the computer program 300 to implement a distribution of processing operations as specified by the distributed processing scheme. The modification includes generating a specification for a first new data processing component 306 that implements a partitioning operation. The partitioning component 306 is inserted into the modified computer program 304 upstream of the portion 302 of the modified computer program 304 that is to implement the distributed processing, e.g., between an upstream component 310 and a first component 312 of the distributed processing portion 302. The link that connects the upstream component 310 to the first component 312 in the original computer program 300 is deleted, and two new links are generated to connect the partitioning component 306 to the components 310, 312. In addition, the modification includes generating a specification for a second new data processing component 308 that implements a gathering operation. The gathering component 308 is inserted into the modified computer program 304 downstream of the portion 302 of the modified computer program 304 that is to implement the distributed processing, e.g., between a last component 314 of the distributed processing portion 302 and a downstream component 316. The link that connects the last component 314 to the downstream component 316 in the original computer program 300 is deleted, and two new links are generated to connect the gathering component 308 to the components 314, 316.

In some examples, the original computer program already implements a distributed processing scheme, and the update is a change to the portioning of the distributed processing scheme. The change can be a change in the number of parallel streams (e.g., the original computer program implements N parallel streams and the update is a change to M parallel streams). The change can be a change in the way in which data records are partitioned. For instance, the original computer program may implement partitioning of data records based on a first characteristic of data contained in the data records (e.g., data records may be partitioned according to customer number), and the modified computer program may implement partitioning of data records based on a different characteristic of the data (e.g., data records may be partitioned according to product number). The change can be a change in the location of the distributed processors. For instance, both the original computer program and the modified computer program can implement the same number of parallel streams, but processing by the original computer program is carried out by local processors and processing by the modified computer program is carried out by cloud-based processors.

In an example, the modification of the computer program 300 to introduce a distributed processing scheme is performed as follows. The lineage, architecture, and operation of the computer program 300 are characterized in an automated analysis process. A user provides input identifying one or more processes that are to be implemented according to a distributed processing scheme, and input identifying characteristics of the partitioning, e.g., a number of parallel streams and a location (e.g., path) for each of the processors that is to execute a portion of the distributed processing scheme. A characterization of the input is joined with the characterization of the lineage, architecture, and operation of the computer program 300 and the modified computer program 304 is produced. For instance, the set of components of the computer program that together correspond to the one or more processes identified in the user input are identified, and partition and gather components are inserted upstream and downstream, respectively, of the identified set of components.

Figure 4:
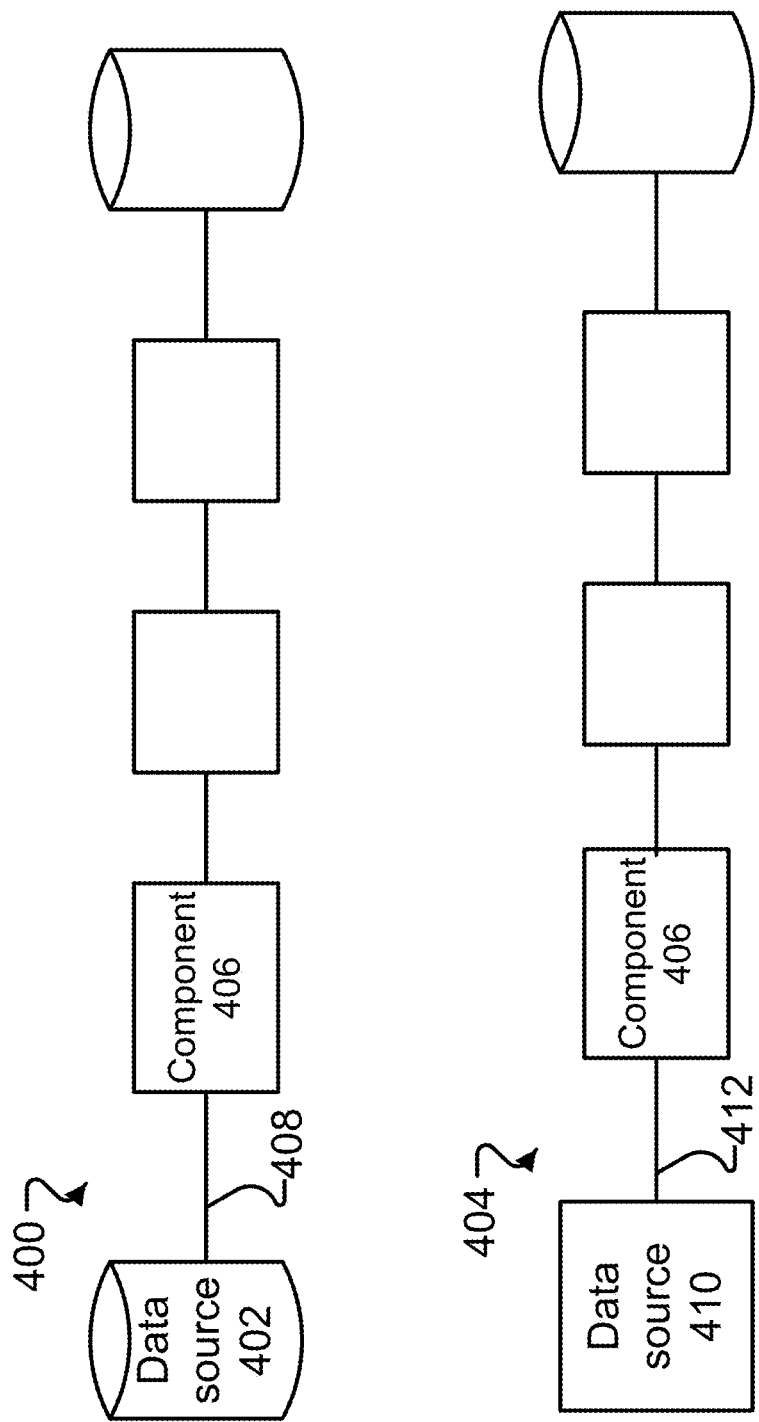

FIG. 4 illustrates examples of a computer program 400 and a modified computer program 404 that has been modified to change the data source. The computer program 400 receives data records from a first data source (in this example, a database) corresponding to a data source component 402 connected to a processing component 406 of the computer program 400 by a first link 408. The update changes the source of the data records, such that the modified computer program 404 receives data records from a second data source represented by a data source component 410 connected to the processing component 406 by a second link 412. In the example of FIG. 4, the first data source corresponding to the data source component 402 is a database, and the second data source is a file system, with the data source component 410 being a component configured to read from a Hadoop Distributed File System (HDFS). Other types of data sources can be used for the computer program 400, the second computer program 404, or both. In some examples, both data sources can be data sources of the same type, and an attribute, such as a name or location (e.g., path) of the data source can be changed.

In some examples, the data source component 410 can be identical to the data source component 402 except for a change in a characteristic of the data source, e.g., a name or path (e.g., location) of the data source, e.g., a change from a local data source to a cloud-based data source. For instance, a parameter of the data source component 402 can be changed, resulting in the data source component 410. In some examples, the modification to the computer program involves deleting the data source component 402 and the first link 408, and adding the data source component 410 and the second link 412 to connect the newly added data source component 410 to the processing component 406, where the newly added data source component 410 represents the data source for the modified computer program 404.

In an example, the modification of the computer program 400 to change the data source is performed as follows. The lineage, architecture, and operation of the computer program 400 are characterized in an automated analysis process. A user provides input indicative of a change to the data source, e.g., an identification of a data source path in the computer program that is to be changed to a different data source path in the modified computer program. A characterization of the input is joined with the characterization of the lineage, architecture, and operation of the computer program 400 and the modified computer program 404 is produced. For instance, a search-and-replace process is performed to identify data sources matching the data source path specified in the user input and to replace corresponding data source components with new data source components representing data sources having the different data source path.

Figure 5:
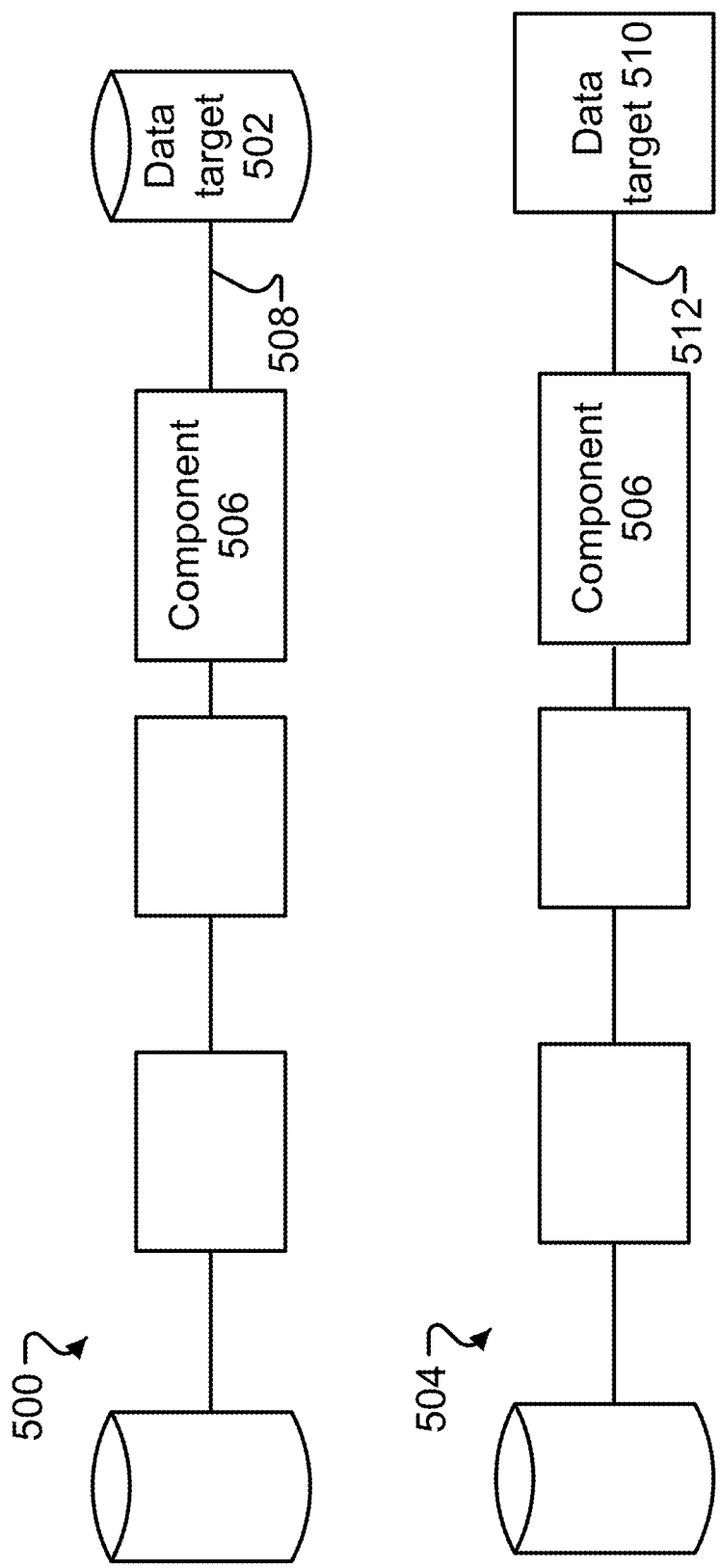

FIG. 5 illustrates examples of a computer program 500 and a modified computer program 504 that has been modified to change the data target. The computer program 500 outputs processed data records to a first data target (in this example, a database) represented by a data target component 502 connected to a processing component 506 of the computer program 500 by a first link 508. The update changes the target for the processed data records, such that the modified computer program 504 outputs processed data records to a second data target (in this example, a file system) represented by a data target component 510 connected to the processing component 506 by a second link 512. Although the processing component 506 is shown as being the same component between the computer program 500 and the modified computer program 504, in some examples, the processing component can also differ between the two computer programs.

In some examples, the data target component 510 can be identical to the data target component 502 except for a change in a characteristic of the data target, e.g., a name or path (e.g., location) of the data target, e.g., a change from a local data target to a cloud-based data target. In some examples, the modification to the computer program involves deleting the data target component 502 and the first link 508, and adding the data target component 510 and the second link 512 to connect the newly added data target component 510 to the processing component 506, where the newly added data target component 510 represents the data target for the modified computer program 504.

In some examples, the data targets can be different types of file transfer protocols, e.g., the data target component 502 can implement a first type of file transfer protocol and the data target component 510 implements a second type of file transfer protocol, e.g., a secure ftp protocol.

In an example, the modification of the computer program 500 to change the data target is performed as follows. The lineage, architecture, and operation of the computer program 500 are characterized in an automated analysis process. A user provides input indicative of a change to the data target, e.g., an identification of a data target path in the computer program that is to be changed to a different data target path in the modified computer program. A characterization of the input is joined with the characterization of the lineage, architecture, and operation of the computer program 500 and the modified computer program 504 is produced. For instance, a search-and-replace process is performed to identify data targets matching the data target path specified in the user input and to replace corresponding data target components with new data target components representing data targets having the different data target path.

A computer program can be modified to change the data target for output data records to comply with restrictions regarding storage of data in a cloud-based data storage, such as a cloud-based file system or database. For instance, privacy rules may stipulate that certain data having a certain characteristic, such as data records including personally identifiable information (PII), not be stored in a cloud-based data storage, and that other data be stored in a cloud-based data storage.

Identification of a data target in the computer program 500 that will receive data records including PII can be performed by a data lineage analysis, in some cases in combination with a semantic discovery analysis.

Data lineage is information that describes the life cycle of data records that are processed by a computer program, such as a dataflow graph. Data lineage information for a given data record includes an identifier of one or more data records on which the given data record depends, one or more downstream data records that depend on the given data record, one or more components of a computer program that process data records to generate the given data record, and one or more components of a computer program that process the given data record or data records that depend on the given data record. By a downstream data record depending on an upstream data record, we mean that the processing of the upstream data record by the computer program directly or indirectly results in the generation of the downstream data record. The generated downstream data record can be a data record that is output from the computer program (sometimes referred to as an output data record) or can be a data record that is to be processed further by the computer program (sometimes referred to as an intermediate data record). The upstream data record can be a data record input into the computer program (sometimes referred to as an input data record or a reference data record) or a data record that has already undergone processing by the computer program (sometimes referred to as an intermediate data record). A data lineage analysis is an analysis of a computer program to identify data records that depend on a given data record or on which a given record depends, and to identify components of the computer program that that process data records to generate the given data record, that process the given data record, or that process data records that depend on the given data record.

For the specific example of ensuring that data records containing PII are not stored on or processed by a cloud-based system, data lineage analysis can be performed to identify components that process data records containing PII or data targets that receive data records containing PII. These data targets can remain as local data targets, and these components can be implemented using local processors.

In some examples, data records containing PII are identified automatically in a semantic discovery process. Further description of semantic discovery can be found in U.S. Patent Application Publication No. 2020/0380212, the contents of which are incorporated here by reference in their entirety.

Figure 6:
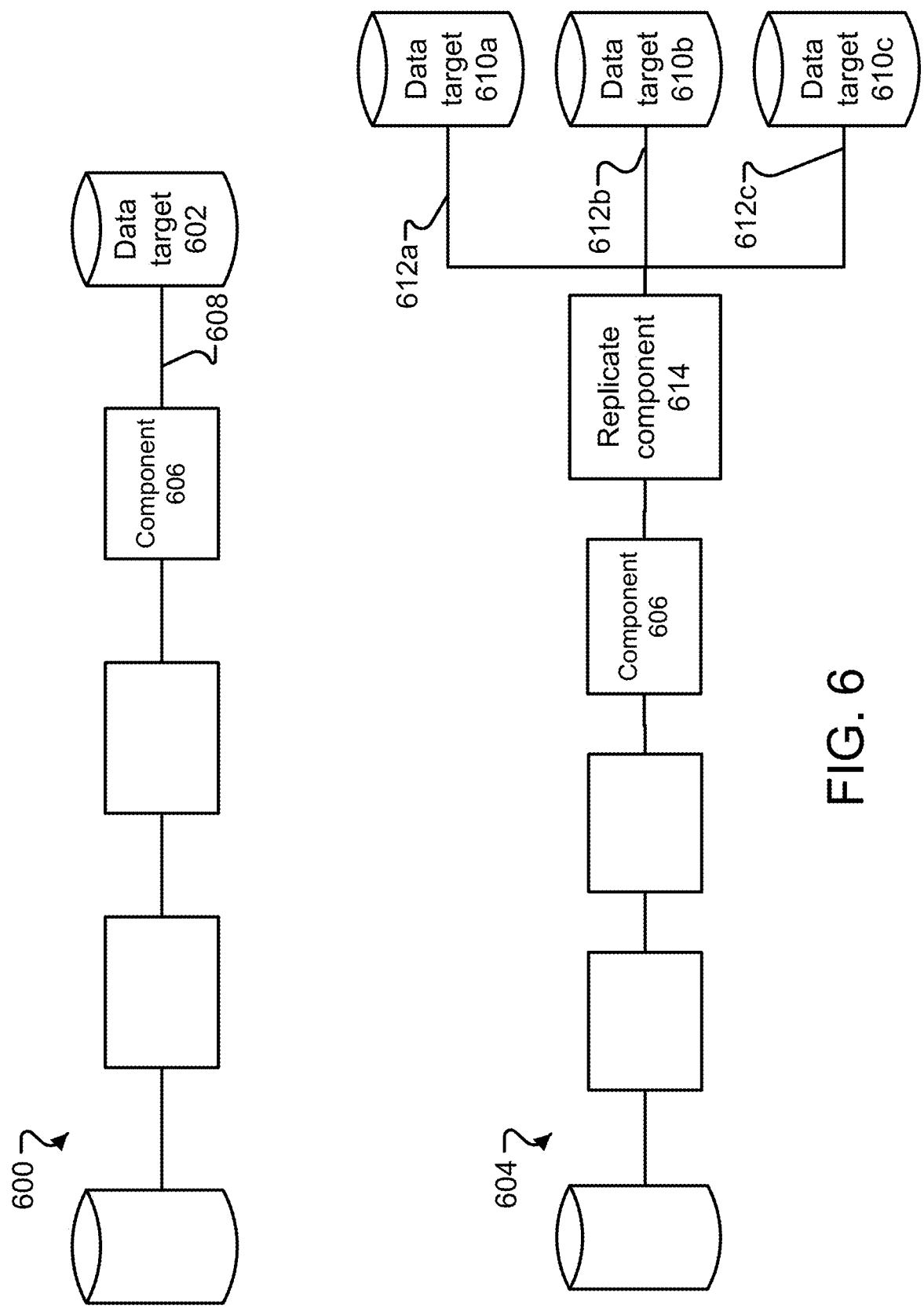

FIG. 6 illustrates examples of a computer program 600 and a modified computer program 604 that has been modified to output processed data records to multiple data targets. The computer program 600 outputs processed data records to a first data target (in this example, a database) represented by a data target component 602 connected to a processing component 606 of the computer program 600 by a first link 608. The update removes the first data target and introduces a replicate component 614 to replicate the dataflow, and multiple second data targets (in this example, multiple databases), each represented by a data target component 610a-610c connected to the processing component 606 by a respective second link 612a-612c. At least one of the second data targets can be in a location different from the location of the other second data targets. In some examples, one of the second data targets is the same as the first data target, and additional data targets have been added. In some examples, all of the second data targets are different from the first data target. In some examples, the opposite modification can be made, such that a computer program that outputs processed data records to multiple data targets can be modified to output processed data records to only a single data target. Other types of data targets, such as file systems, can be used for the computer program 600, the modified computer program 604, or both.

In some examples, the modification to the computer program involves deleting the data target component 602 and the first link 608, and adding the data target components 610a-610c and the second links 612a-612c to connect the newly added data target components 610a-610c to the processing component. For instance, one of the data target components (e.g., component 610a) and its corresponding link (e.g., link 612a) are added. The component 610a and link 612a are then replicated to generate and connect the other data target components 610b, 610c. Parameters of the data target components 610b, 610c are then changed to reference the respective data targets.

Figure 7:
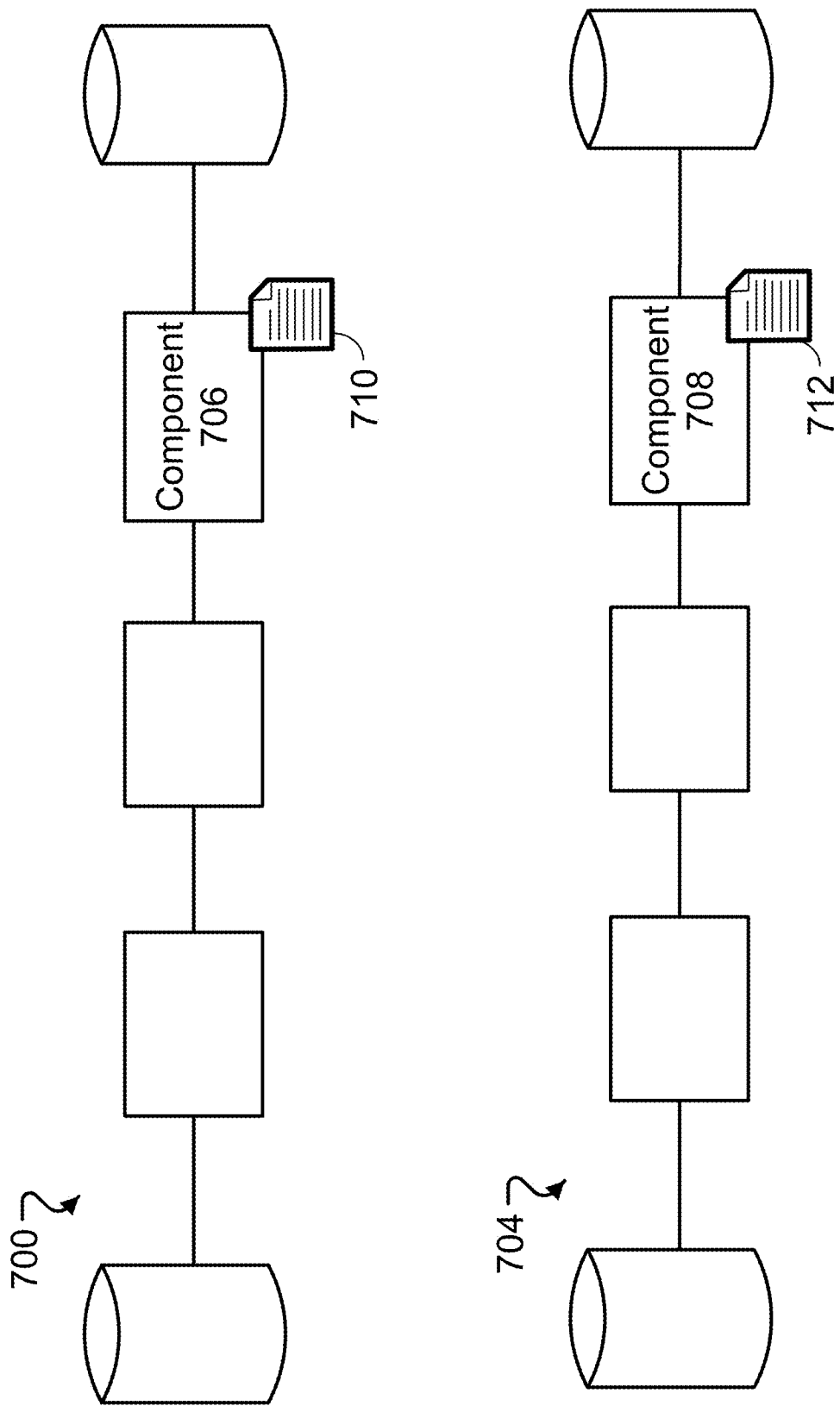

FIG. 7 illustrates examples of a computer program 700 and a modified computer program 704. A component 706 of the computer program 700 implements a process according to a first parameter set 710. The update modifies the component 706 such that the process is implemented according to a second (different) parameter set 712. The modification includes analyzing the computer program 700 to identify a data processing component that includes a particular parameter, parameter expression, or parameter value. In some examples, a specification for the identified component is modified, e.g., by changing a value or expression for one or more parameters in the parameter set 710 of the identified component, to generate a modified component 708 with the modified parameter set 712. In some examples, the identified component 706 is deleted and replaced by a new component 708 with a different parameter set.

Figure 8:
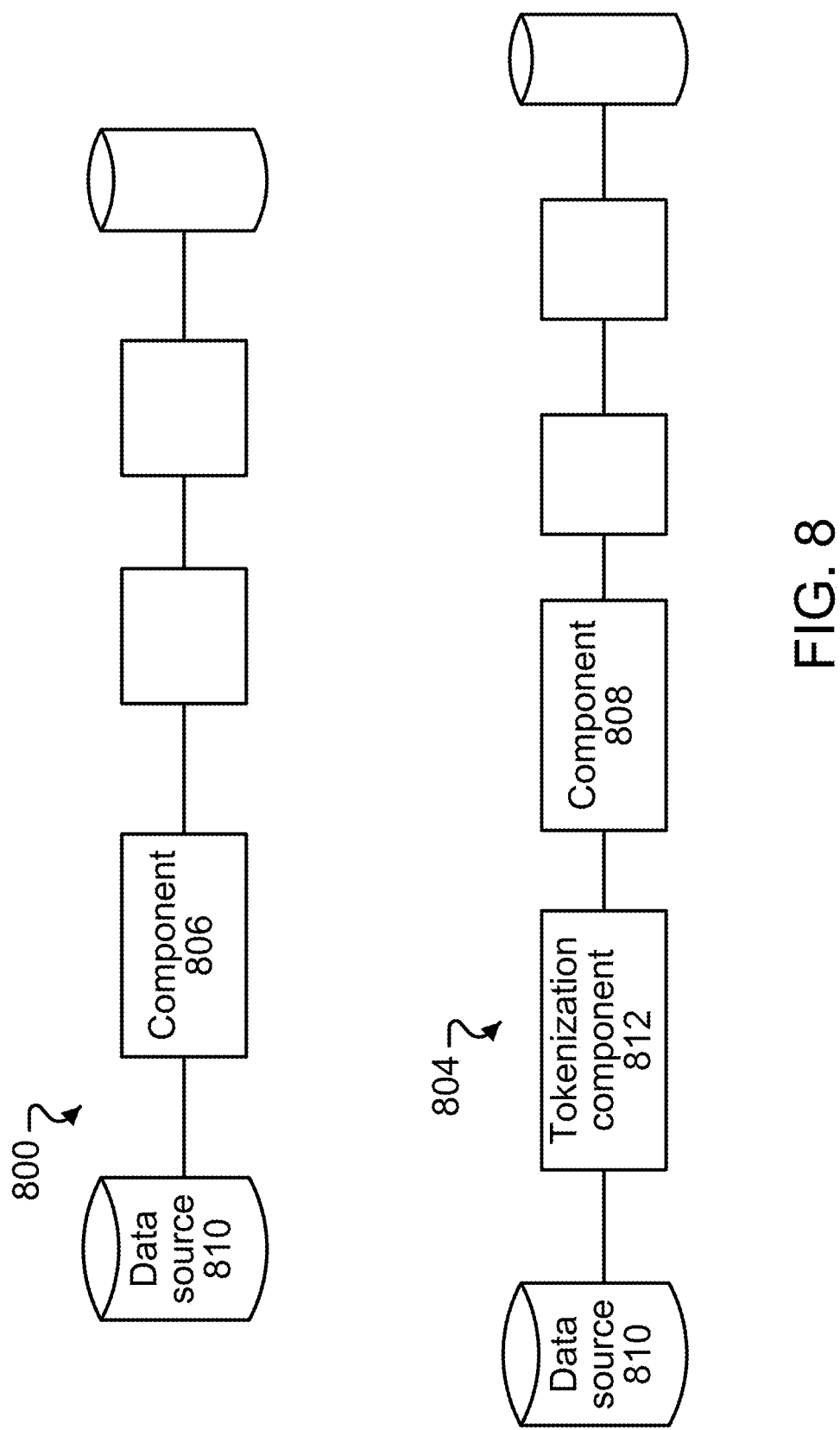

FIG. 8 illustrates examples of a computer program 800 and a modified computer program 804. The computer program 800 is configured for execution on a local computer system, and the modified computer program 804 is configured such that execution of at least a portion of the modified computer program 804 occurs on a cloud-based system. To comply with restrictions regarding PII in a cloud-based system, e.g., a prohibition of processing or storage of PII in a cloud-based system, the computer program is modified such that any PII in the data records received and processed by the computer program 800 is anonymized by the modified computer program 804 prior to reaching the cloud-based system.

The modification of the computer program 800 includes analyzing the computer program to identify a data processing component (e.g., component 806) that is configured to receive, from a data source represented by a data source component 810, and process data records that have one or more fields containing PII. The analysis can be a data lineage analysis, e.g., performed in combination with a semantic discovery analysis. The component 806 is modified such that a modified component 808 of the modified computer program 804 is configured to be executed on a cloud-based computing system, e.g., as described above. In addition, a new component 812 is added between the data source 810 and the component 806, such that the new component 812 receives data records from the data source 810 and outputs data records to the component 808. The component 812 is configured to be executed on a local (e.g., non-cloud based) computer system, and implements a tokenization service that is configured to anonymize the PII contained in the fields of records received from the data source 810, e.g., by substituting a token for the PII. The token maps back to the PII through a tokenization system but ensures that the PII itself is not provided to the cloud-based system where other processing operations of the modified computer program 804 occur.

In some examples, the token has a different format than the PII. For instance, when the PII is a social security number, the PII is a nine-digit number, but the token may be an alphanumeric value with a different number of digits. When the format of the token differs from the format of the PII, the component 808 is modified to change a definition of a record format for data records to be processed by the component 808 to render the component 808 compatible with the format of the token. In some instances, other downstream components are also modified accordingly to handle data records of the different record format.

In some examples, if the data records output from the computer program 800 include PII, the data records output from the modified computer program 804 include the respective tokens for the PII. In some examples, a detokenization component is added to the modified computer program 804, e.g., just upstream of the data target, to reintroduce the PII to the data records in a process executed on a local computer system. The detokenization component is added in a process similar to the way in which the tokenization component 812 is added.

In some examples, the component(s) to be updated are identified and replaced automatically in a search-and-replace process. The search-and-replace process, when applied to a particular computer program, implements a find function, which finds the components of the computer program and obtains their attributes; a filter function, which filters components having attributes that match a target attribute (e.g., an attribute identified as triggering replacement in the user's characterization of the update); a reformat function, which describes how each replacement will be performed; and a replacement function, which performs the replacements.

Figure 9:
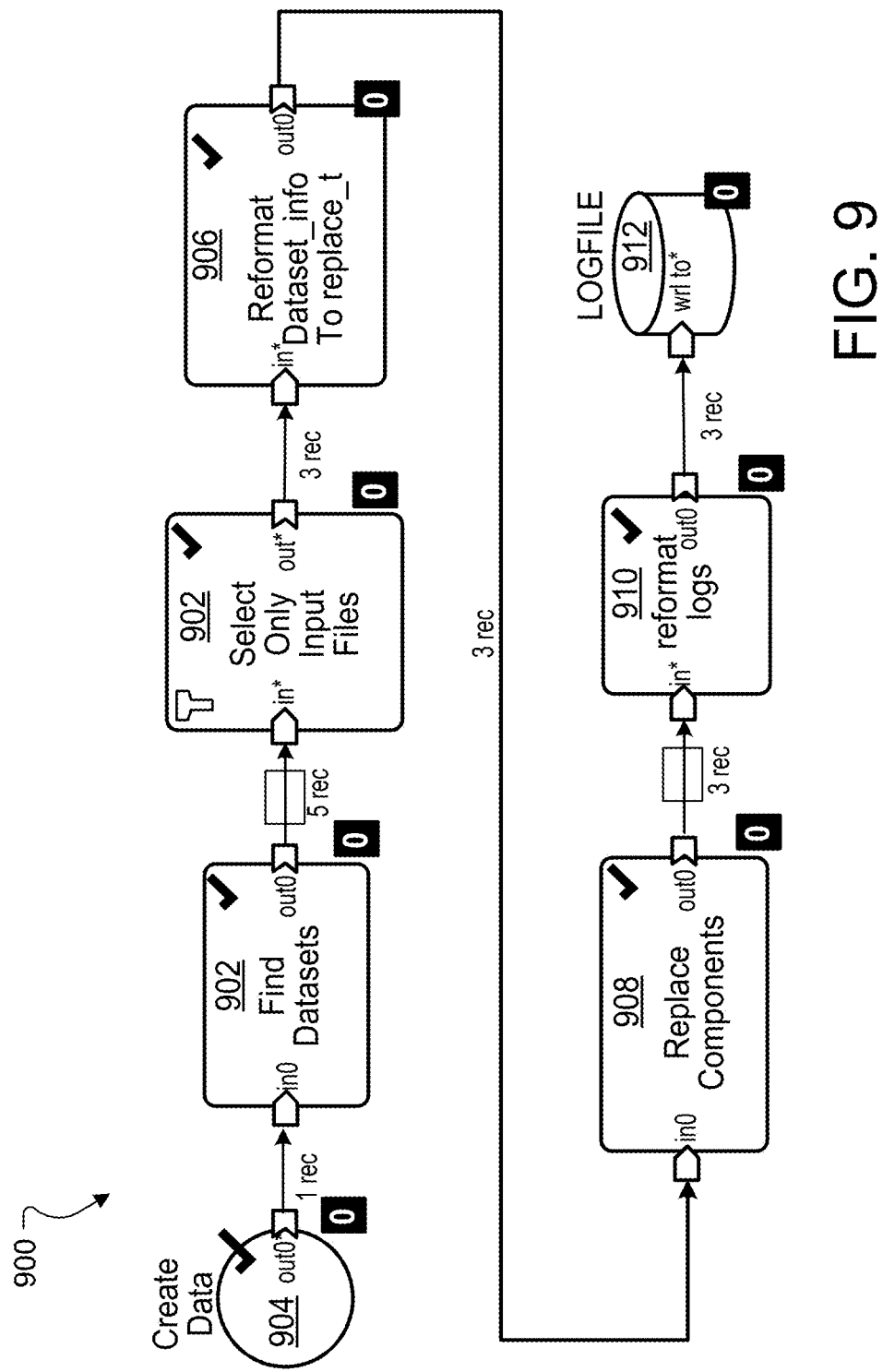
FIG. 9 is a diagram of a dataflow graph.

FIG. 9 shows an example of a dataflow graph 900 that implements a search-and-replace process. In the example of FIG. 9, the search-and-replace process replaces input files with components configurable to read from a Hadoop Distributed File System (HDFS). A first processing component 902 of the dataflow graph 900 receives a data record from an input component 904. The data record provides instructions for the replacement process, including an identification of the computer program (e.g., dataflow graph) in which the replacement is to be performed, an attribute of the components to be replaced, and a description of the replacement components.

The first processing component 902 is a find component that finds all of the components of the computer program and obtains their attributes. The find component 902 passes a set of data records to a filter component 906, with each record corresponding to one component of the computer program in which the replacement is to be performed. Each record includes identifiers of the respective component (e.g., an identification of the computer program, an identifier, such as path, of the component) and a listing of the attributes of the respective component of the computer program.

The filter component 906 filters the data records received from the find component 902 to retain those records corresponding to components having attributes that match a target attribute (e.g., an attribute identified as triggering replacement in the user's characterization of the update). In this example, the filter component 906 filters the data records to retain only data records corresponding to components representing input files. The retained data records are passed to a reformat component 908.

The reformat component 908 creates records descriptive of the replacement component that is to replace each of the components corresponding to the records received from the filter component 906. These records can include some or all of the following data:

An identification of the computer program (e.g., dataflow graph) in which the replacement is to be performed;
An identification (e.g., path) of the component of the computer program that is to be replaced;
An identification (e.g., a parameterized path) to the new replacement component;
A name of the new replacement component
A listing (e.g., a vector) of the names of ports of the replacement component;

A mapping of the names of ports of the replacement component to the names of ports of the component that is to be replaced;

A listing (e.g., a vector) of the names of the parameters of the replacement component;

A mapping of the names of parameters of the replacement component to the names of parameters of the component that is to be replaced;

A listing (e.g., a vector) of instance values to be replaced.

The records that are output from the reformat component 908 characterize the replacement. These records are provided to a replace component 910, which implements the replacement of each component indicated by the records. A log of the replacement operation is output to a log file 912.

Figure 10A:
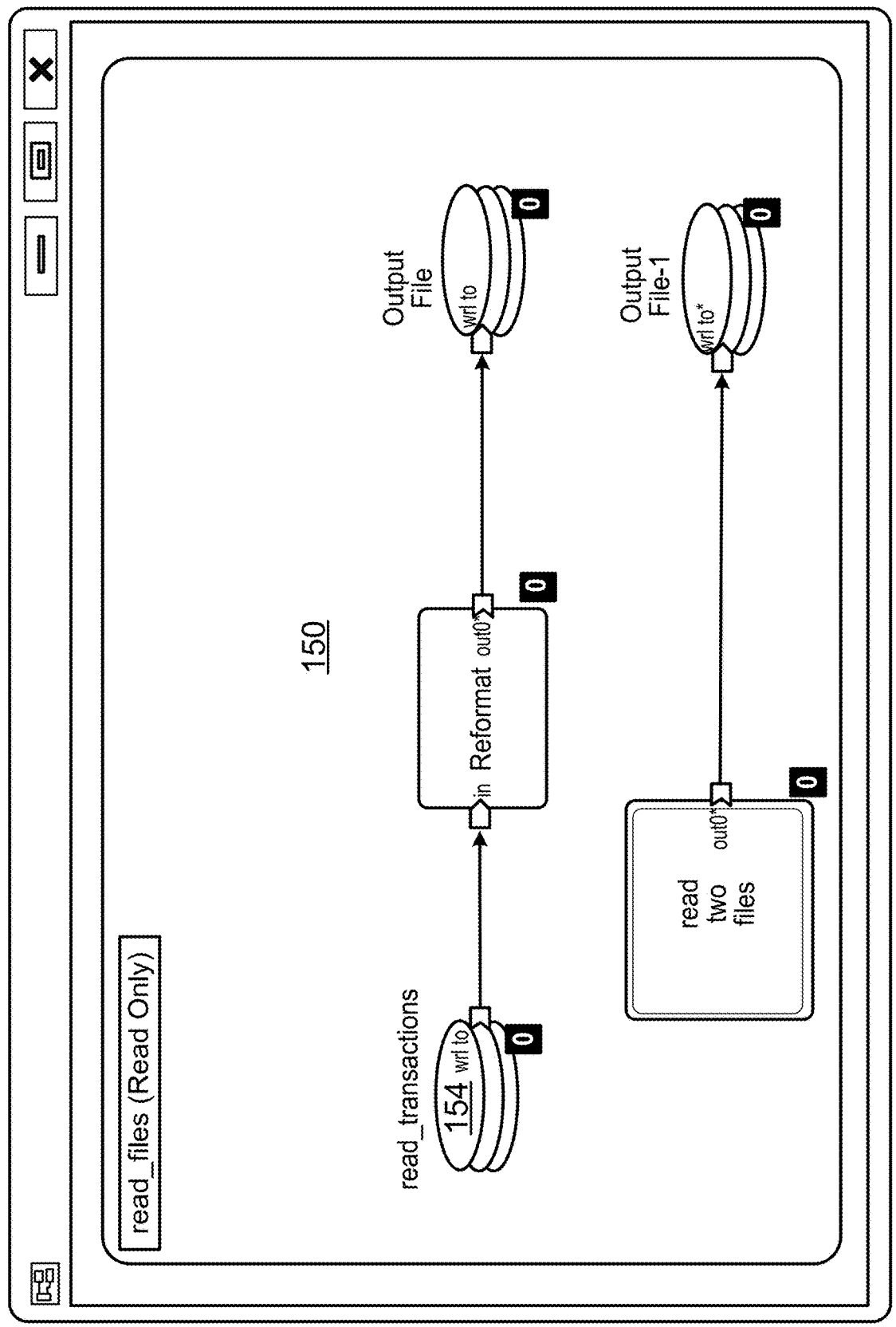
FIGS. 10A and 10B are diagrams of portions of an original dataflow graph and a modified dataflow graph, respectively.
Figure 10B:
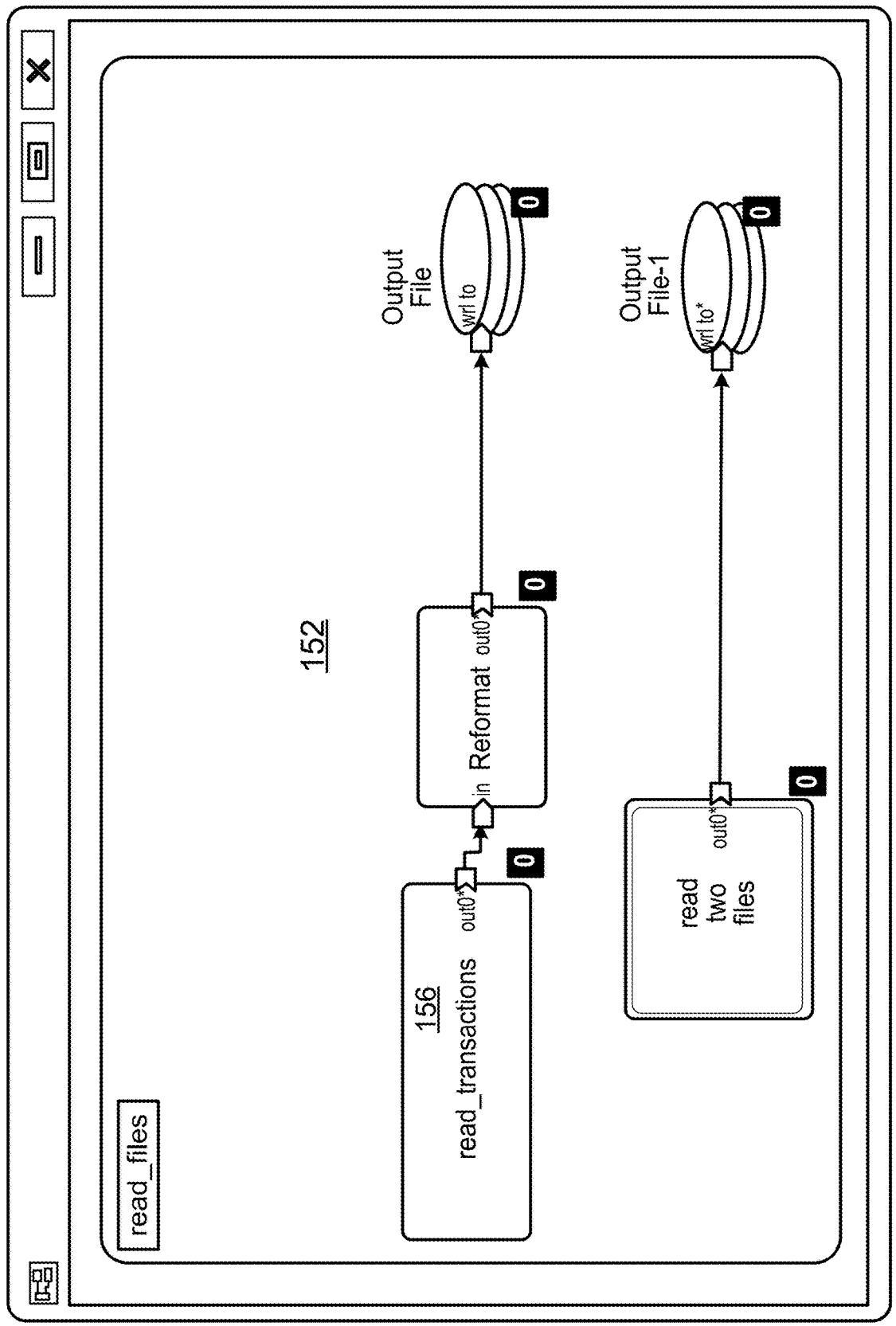

FIGS. 10A and 10B show examples of an original dataflow graph 150 and a modified dataflow graph 152 that was updated using an automated search-and-replace process to replace input files, represented as a component 154, with a READ HDFS component 156.

In some examples, the modified computer program is tested prior to release to validate the operation of the modified computer program. For instance, the modified computer program may be expected to output data records that are identical to data records output by the original computer program for the same set of input data records. The testing can involve providing the same set of input data records to both the original computer program and the modified computer program and obtaining respective sets of processed data records from both computer programs. The two sets of processed data records are compared. If the two sets of processed data records match, e.g., are identical (e.g., identical within a threshold), the modified computer program is validated. If two sets of process data records do not match, an error message is outputted, preferably with guidance indicating how to resolve the error.

In some examples, only a portion of the modified computer program is tested, e.g., only the portion of the modified computer program that was changed relative to the original computer program. A portion of a computer program can be tested by making use of insertions, such as test sources and probes, that are objects associated with flows in a dataflow graph. A test source replaces data passing through a flow (e.g., upstream data) with new data, such that upstream computations do not need to be rerun for each execution of the computer program. For instance, a test source can replace a data source such that test data records are provided to the graph from the test source rather than from the data source. A probe monitors data records passing through a flow as the graph executes, and can cause the data records to be saved for later examination or reuse. For instance, a probe can receive data records that would otherwise have been saved to a data target, such as a database. Insertions can also be introduced at locations in a dataflow graph other than at data sources and targets, enabling a graph developer to access data records as they flow through the graph. By using insertions, a set of input data records can be provided to the original computer program and the modified computer program immediately upstream of the portion of the computer program that was modified, and processed data records can be retrieved immediately downstream of the modified portion. The use of insertions can enable more efficient testing in that less than the entire computer program is executed during the test. Further description of insertions can be found in U.S. Pat. No. 10,055,333, titled "Debugging a Graph," and U.S. Pat. No. 9,880,818, titled "Application Testing," the contents of both of which are incorporated here by reference in their entirety.

Figure 11:
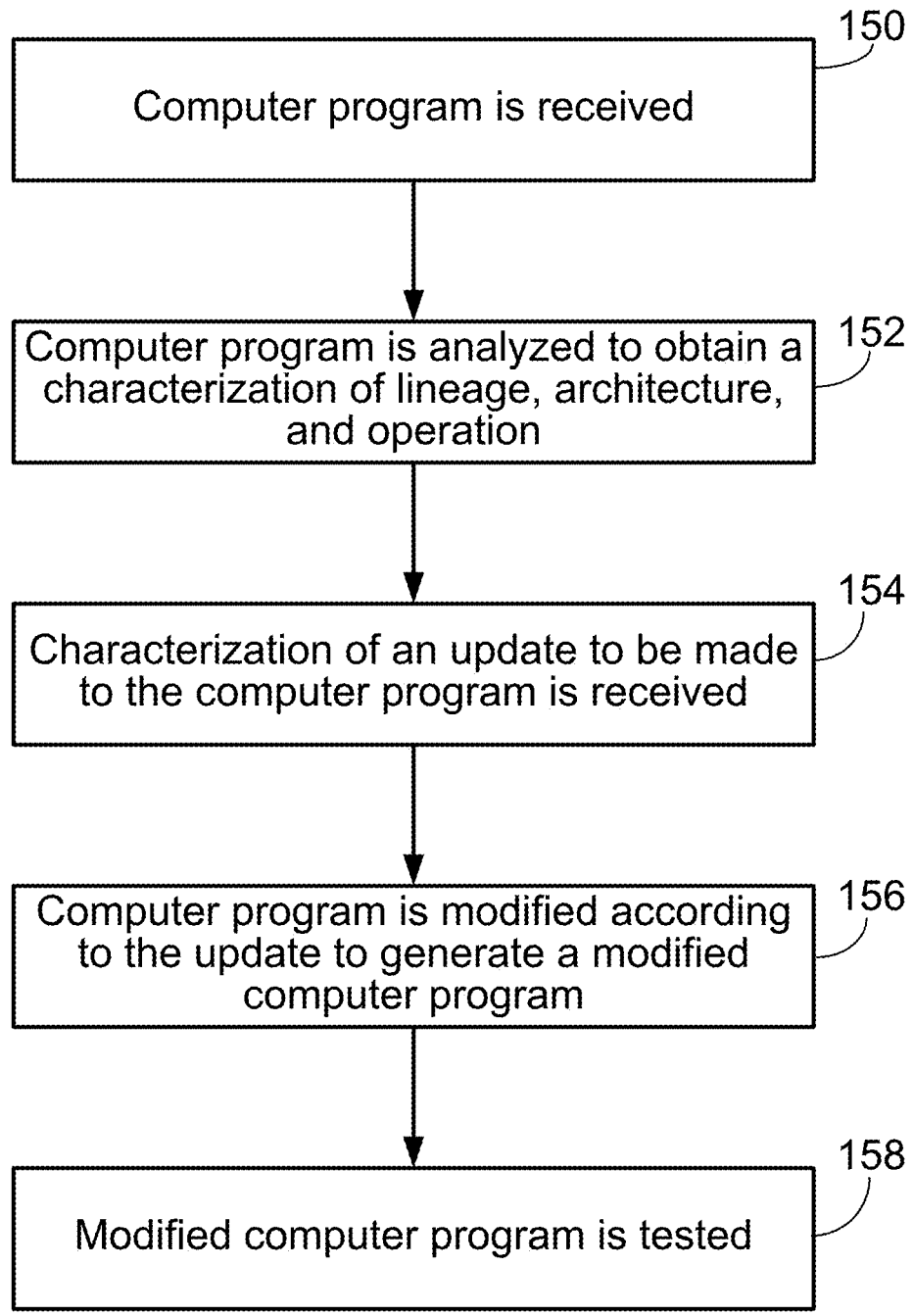
FIGS. 11 and 12 are flow charts.

Referring to FIG. 11, in an example process for updating a computer program, a computer program is received (150). The computer program is configured to, when executed, receive data records from a data source, process data contained in fields of the data records, and output processed data records to a data target. The computer program can be a dataflow graph that includes data processing components configured to process values in fields of data records, the data processing components being connected by links representative of flows of data records.

The computer program is analyzed by one or more processors to obtain characterization of a lineage, an architecture, and an operation of the computer program (152). The analysis can include a static analysis of the computer program, a runtime analysis of the computer program, a schedule analysis of the computer program, a data lineage analysis of the computer program, a semantic discovery analysis of the computer program, or other types of analysis. The lineage of a computer program includes relationships among elements of the computer program and, optionally, relationships between the computer program and other computer programs. The architecture of a computer program includes a characteristic of the data source, a characteristic of the data target, and a characteristic of one or more processors configured to process the data contained in data records. The operation of a computer program includes processes of the computer program that are executed to process the data from the data records.

A characterization of an update to be made to the computer program is received (154), e.g., by user input into a user interface. The update is such that when the computer program is modified according to the update, at least some of the modified computer program is configured to be hosted on and executed by a second computing system, such as a cloud-based system.

The computer program is modified to implement the update, thereby generating the modified computer program (156). The modification includes modifying one or more of the lineage of the computer program, architecture of the computer program, or the operation of the computer program. The modification can include merging the characterization of the update with the characterization of the lineage, the architecture, and the operation of the computer program.

When the computer program is a dataflow graph, modifying the computer program can include modifying a value or an expression for a parameter of a data processing component or a link of the computer program; adding a new data processing component or link, deleting a data processing component or link, or other suitable modifications.

At least a portion of the modified computer program is tested (158). The testing includes providing input test data records to the at least a portion of the modified computer program; and obtaining first processed data records from the at least a portion of the modified computer program. The testing also includes testing at least a portion of the computer program that corresponds to the tested portion of the modified computer program, including providing the input test data records to the at least a portion of the computer program, and obtaining second processed data records from the at least a portion of the computer program. The first and second processed data records are compared. The testing may include feeding the modified computer program with test data that triggers each or substantially all functions of the computer program to generate the processed data records as output.

Figure 12:
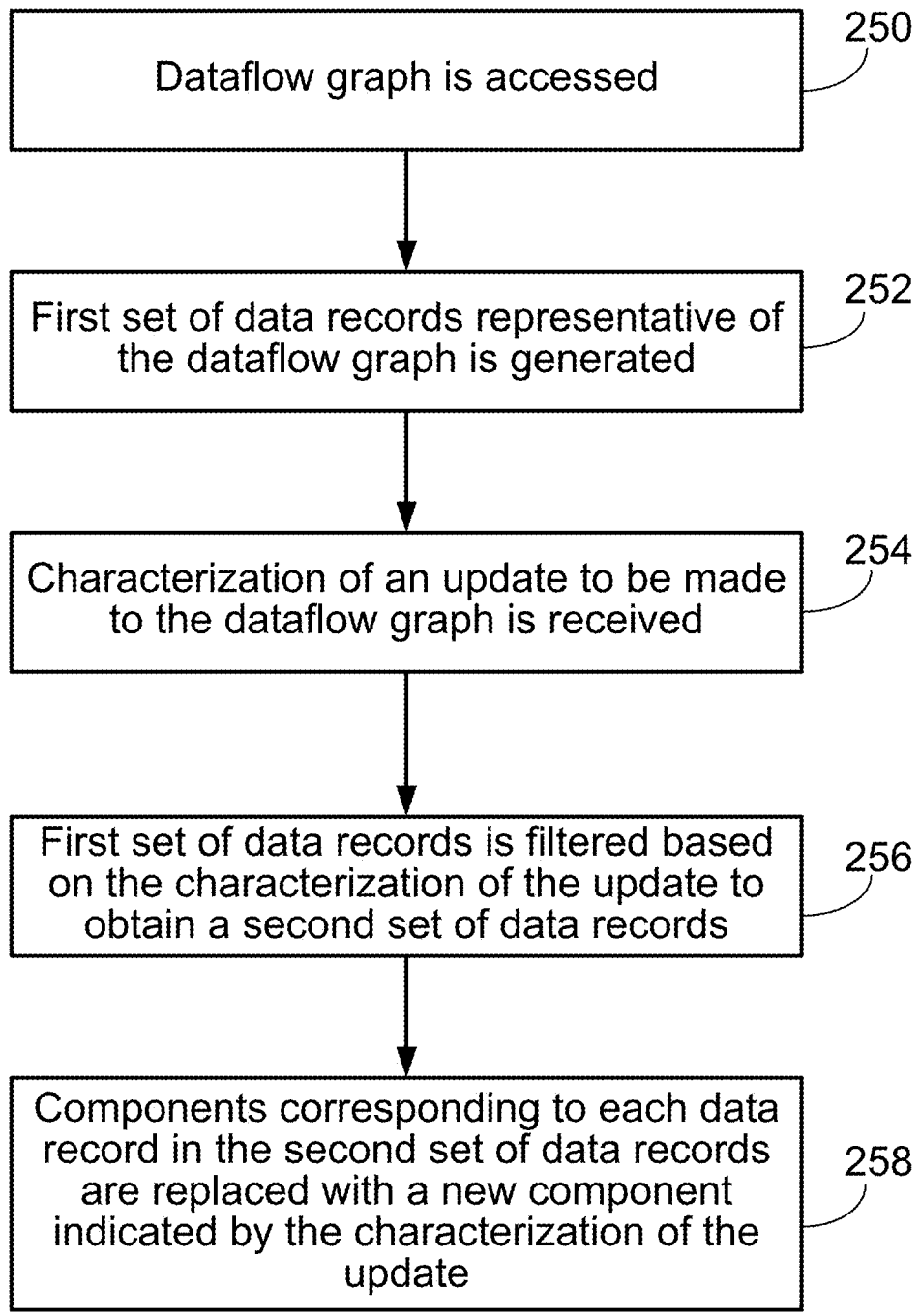

Referring to FIG. 12, an example process for updating a dataflow graph includes accessing a dataflow graph (250). A specification of the dataflow graph defines nodes, at least one of the nodes representing a data processing component defining an operation to be performed to process data in one or more fields of a data record having a record format, the data records being provided to the data processing component, and one or more links connecting the nodes and each representing a flow of data records.

A first set of records is generated, the first set of records representative of the dataflow graph (252). This includes generating a data record corresponding to each of the data processing components of the dataflow graph, each data record containing: an identifier of the data processing component, and attribute values for attributes of the data processing component.

A characterization of an update to the dataflow graph is received (254), the characterization of the update indicative of a target value for a particular attribute. The first set of data records is filtered based on the target value indicated by the characterization of the update to obtain a second set of data records (256). The includes removing, by the filtering, data records that do not contain an attribute value for the particular attribute that matches the target value indicated by the characterization of the update.

For each data record in the second set of data records, the corresponding component is replaced with a new component indicated by the characterization of the update (258).

FIG. 13 shows an example of a data processing system 850 for developing and executing dataflow graphs in which the techniques described here can be used. The system 850 includes a data source 852 that may include one or more sources of data such as storage devices or connections to online data streams, each of which may store or provide data in any of a variety of formats (e.g., database tables, spreadsheet files, flat text files, or a native format used by a mainframe computer). The data may be logistical data, analytic data or industrial machine data. An execution environment or runtime environment 854 includes a pre-processing module 856 and an execution module 862. The execution environment 854 may be hosted, for example, on one or more general-purpose computers under the control of a suitable operating system, such as a version of the UNIX operating system. For example, the execution environment 854 can include a multiple-node parallel computing environment including a configuration of computer systems using multiple processing units (such as central processing units, CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 852 may be local to the execution environment 854, for example, being stored on a storage medium (e.g., hard drive 858) connected to a computer hosting the execution environment 854, or may be remote to the execution environment 854, for example, being hosted on a remote system (e.g., mainframe computer 860) in communication with a computer hosting the execution environment 854, over a remote connection (e.g., provided by a cloud computing infrastructure).

The pre-processing module 856 reads data from the data source 852 and prepares data processing applications (e.g. an executable dataflow graph) for execution. For instance, the pre-processing module 856 can compile the data processing application, store and/or load a compiled data processing application to and/or from a data storage system 866 accessible to the execution environment 854, and perform other tasks to prepare a data processing application for execution.

The execution module 862 executes the data processing application prepared by the pre-processing module 856 to process a set of data and generate output data 864 that results from the processing. The output data 864 may be stored back in the data source 852 or in a data storage system 866 accessible to the execution environment 854, or otherwise used. The data storage system 866 is also accessible to an optional development environment 868 in which a developer 870 is able to design and edit the data processing applications to be executed by the execution module 862. The development environment 868 is, in some implementations, a system for developing applications as dataflow graphs that include vertices (representing data processing components or datasets) connected by directed links (representing flows of work elements, i.e., data) between the vertices. For example, such an environment is described in more detail in U.S. Patent Publication No. 2007/0011668, titled "Managing Parameters for Graph-Based Applications," the contents of which are incorporated here by reference in their entirety. A system for executing such graph-based computations is described in U.S. Pat. No. 5,966,072, titled "Executing Computations Expressed as Graphs," the contents of which are incorporated here by reference in their entirety. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 856 can receive data from a variety of types of systems that may embody the data source 852, including different forms of database systems. The data may be organized as records having values for respective fields (also called "attributes" or "columns"), including possibly null values. When first reading data from a data source, the pre-processing module 856 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

In other words, and generally applicable to executable dataflow graphs described herein, the executable dataflow graph implements a graph-based computation performed on data flowing from one or more input data sets of a data source 852 through the data processing components to one or more output data sets, wherein the dataflow graph is specified by data structures in the data storage 864, the dataflow graph having the nodes that are specified by the data structures and representing the data processing components connected by the one or more links, the links being specified by the data structures and representing data flows between the data processing components. The execution environment or runtime environment 854 is coupled to the data storage 864 and is hosted on one or more computers, the runtime environment 854 including the pre-processing module 856 configured to read the stored data structures specifying the dataflow graph and to allocate and configure system resources (e.g. processes, memory, CPUs, etc.) for performing the computation of the data processing components that are assigned to the dataflow graph by the preprocessing module 856, the runtime environment 854 including the execution module 862 to schedule and control execution of the computation of the data processing components. In other words, the runtime or execution environment 854 hosted on one or more computers is configured to read data from the data source 852 and to process the data using an executable computer program expressed in form of the dataflow graph.

The approaches described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. A method for updating a computer program, the method being implemented by a computing system and including:
    reading, from a data storage device, a computer program configured to be hosted on and executed by a first computing system, in which the computer program is configured to, when executed, receive data records from a data source, process data contained in fields of the data records, and output data records containing the processed data to a data target;
    storing, to a data storage device, a characterization of a lineage, an architecture, and an operation of the computer program obtained by analyzing, by one or more processors, the read computer program, in which:
        the lineage of the computer program includes static or runtime relationships among elements of the computer program, static or runtime relationships among the computer program and other computer programs, or both,
        the architecture of the computer program includes a characteristic of the data source, a characteristic of the data target, and a characteristic of one or more processors configured to process the data contained in the data records, and
        the operation of the computer program includes processes of the computer program that are executed to process the data from the data records;
    reading, from a data storage device, a characterization of an update to be made to the computer program, in which when the computer program is modified according to the update, at least a portion of the modified computer program is configured to be hosted on and executed by a second computing system, the characterization of the update including an indication to anonymize personally identifiable information (PII) in data to be stored on or processed by the second computing system;
    storing, to a data storage device, the modified computer program, wherein the modified computer program is generated by modifying the computer program to implement the update to generate the modified computer program, including modifying one or more of the lineage of the computer program, the architecture of the computer program, or the operation of the computer program;
    migrating the portion of the modified computer program to the second computing system; and
    executing the modified computer program, including executing the portion of the modified computer program by the second computing system.

2. The method of claim 1, in which the second computing system is a cloud based system.

3. The method of claim 1, in which modifying the computer program includes merging the characterization of the update with the characterization of the lineage, the architecture, and the operation of the computer program.

4. The method of claim 1, in which the computer program includes data processing components configured to receive the data records from the data source, process values in fields of the received data records, and output data records containing results of the processing of the values, wherein the data processing components are connected by links representative of flows of data records.

5. The method of claim 4, in which modifying the computer program includes modifying a value or an expression for a parameter of a data processing component or a link of the computer program.

6. The method of claim 4, in which modifying the computer program includes adding a new data processing component, deleting a data processing component, adding a new link, or deleting a link.

7. The method of claim 1, in which the data source includes a first file system or database, and in which the characterization of the update to be made to the computer program includes an identification of a second file system or database from which the modified computer program is to receive data records.

8. The method of claim 7, in which modifying the computer program includes:
deleting a first data source component of the computer program corresponding to the first file system or database; and
inserting a second data source component corresponding to the second file system or database.

9. The method of claim 1, in which the data target includes a first file system or database, and in which the characterization of the update to be made to the computer program includes an identification of a set of multiple second file systems or databases to which the modified computer program is to output data records, in which at least one of the second file systems or databases is in a location different from a location of at least one other of the second file systems or databases.

10. The method of claim 9, in which modifying the computer program includes:
replicating a flow in the computer program that connects a data processing component of the computer program to a first data target component corresponding to the first file system or database; and
inserting a new component corresponding to a first one of the second file systems or databases, in which the replicated flow connects the data processing component to the new component.

11. The method of claim 9, in which the at least one of the second file systems or databases is a cloud-based file system or database, and in which the characterization of the update includes an identification of a first characteristic of data to be stored in a non-cloud-based storage location, an identification of a second characteristic of data to be stored in the second, cloud-based file system or database, or both.

12. The method of claim 11, in which analyzing the computer program includes conducting a data lineage analysis, and comprising identifying, based on the data lineage analysis, a first component that is configured to receive or output data records having the first characteristic, a second component that is configured to receive or output data records having the second characteristic, or both.

13. The method of claim 11, in which the first characteristic comprises personally identifiable information (PII).

14. The method of claim 11, in which modifying the computer program includes modifying a specification for a first data processing component that outputs data having the first characteristic, modifying a specification for a second data processing component that outputs data having the second characteristic or both.

15. The method of claim 1, in which analyzing the computer program includes identifying a data processing component that is configured to receive first data records having one or more fields containing PII, and in which modifying the computer program includes adding a component configured to implement a tokenization service upstream of the identified data processing component, the tokenization service being configured to receive the first data records and genericize the PII contained in the fields of the received records.

16. The method of claim 15, in which modifying the computer program includes modifying a specification of the identified data processing component to change a definition of a record format for data records to be processed by the identified data processing component.

17. The method of claim 16, in which the second computing system is a cloud-based computing system, and in which modifying the computer program includes specifying a non-cloud-based computing system for execution of the tokenization service.

18. The method of claim 1, including:
testing at least a portion of the modified computer program, the testing including:
providing input test data records to the at least a portion of the modified computer program; and
obtaining first processed data records from the at least a portion of the modified computer program; and
testing at least a portion of the computer program, in which the at least a portion of the computer program corresponds to the tested portion of the modified computer program, in which testing the at least a portion of the computer program includes:
providing the input test data records to the at least a portion of the computer program, and
obtaining second processed data records from the at least a portion of the computer program; and
comparing the first processed data records and the second processed data records.

19. The method of claim 1, in which modifying the computer program includes:
identifying a data processing component of the computer program that has an attribute value that matches a target attribute value indicated by the characterization of the update; and
replacing the identified data processing component with a new data processing component.

20. The method of claim 19, in which identifying the data processing component of the computer program that has the attribute value that matches the target attribute value indicated by the characterization of the update includes:
generating a first set of data records, including generating a data record corresponding to each data processing component of the computer program, in which each data record contains an identifier of the respective data processing component and attribute values for attributes of the respective data processing component; and
filtering the first set of data records based on the attribute values contained in the data records of the first set to obtain a second set of data records, including removing, by the filtering, the data records of the first set that do not contain an attribute value that matches the target attribute value indicated by the characterization of the update.

21. The method of claim 1, in which the lineage of the computer program is defined by one or more parameter values associated with the computer program.

22. The method of claim 21, in which a static relationship is defined by one or more parameter values of a stored parameter set associated with the computer program.

23. The method of claim 21, in which a runtime relationship is defined by a parameter value indicated by a runtime log generated during execution of the computer program.

24. A method for updating a computer program, the method being implemented by a computing system and including:
  reading, from a data storage device, a computer program configured to be hosted on and executed by a first computing system, in which the computer program is configured to, when executed, receive data records from a data source, process data contained in fields of the data records, and output data records containing the processed data to a data target;
  storing, to a data storage device, a characterization of a lineage, an architecture, and an operation of the computer program obtained by analyzing, by one or more processors, the read computer program, in which:
    the lineage of the computer program includes static or runtime relationships among elements of the computer program, static or runtime relationships among the computer program and other computer programs, or both,
    the architecture of the computer program includes a characteristic of the data source, a characteristic of the data target, and a characteristic of one or more processors configured to process the data contained in the data records, and
    the operation of the computer program includes processes of the computer program that are executed to process the data from the data records;
  reading, from a data storage device, a characterization of an update to be made to the computer program, in which when the computer program is modified according to the update, at least a portion of the modified computer program is configured to be hosted on and executed by a second computing system, in which the characterization of the update includes a characterization of a distributed processing scheme for at least a portion of the computer program, and in which modifying the computer program includes modifying a layout of the computer program to implement a distribution of processing operations according to the distributed processing scheme;
  storing, to a data storage device, the modified computer program, wherein the modified computer program is generated by modifying the computer program to implement the update to generate the modified computer program, including modifying one or more of the lineage of the computer program, the architecture of the computer program, or the operation of the computer program;
  migrating the portion of the modified computer program to the second computing system; and
  executing the modified computer program, including executing the portion of the modified computer program by the second computing system.

25. The method of claim 24, in which modifying the computer program includes:
  generating a specification for a first new data processing component configured to implement a partitioning operation;
  generating a specification for a second new data processing component configured to implement a gathering operation;
  inserting the first new data processing component into the computer program upstream of the at least a portion of the computer program; and
  inserting the second new data processing component into the computer program downstream of the at least a portion of the computer program.

26. A method for updating a computer program, the method being implemented by a computing system and including:
  reading, from a data storage device, a computer program configured to be hosted on and executed by a first computing system, in which the computer program is configured to, when executed, receive data records from a data source, process data contained in fields of the data records, and output data records containing the processed data to a data target;
  storing, to a data storage device, a characterization of a lineage, an architecture, and an operation of the computer program obtained by analyzing, by one or more processors, the read computer program, in which:
    the lineage of the computer program includes static or runtime relationships among elements of the computer program, static or runtime relationships among the computer program and other computer programs, or both, the architecture of the computer program includes a characteristic of the data source, a characteristic of the data target, and a characteristic of one or more processors configured to process the data contained in the data records, and
    the operation of the computer program includes processes of the computer program that are executed to process the data from the data records;
  reading, from a data storage device, a characterization of an update to be made to the computer program, in which when the computer program is modified according to the update, at least a portion of the modified computer program is configured to be hosted on and executed by a second computing system;
  storing, to a data storage device, the modified computer program, wherein the modified computer program is generated by modifying the computer program to implement the update to generate the modified computer program, including modifying one or more of the lineage of the computer program, the architecture of the computer program, or the operation of the computer program, in which modifying the computer program includes:
  identifying a data processing component of the computer program that implements a first type of file transfer protocol; and modifying a specification for the data processing component according to a second type of file transfer protocol, in which the characterization of the update includes an indication of a change from the first type of file transfer protocol to the second type of file transfer protocol;
  migrating the portion of the modified computer program to the second computing system; and
  executing the modified computer program, including executing the portion of the modified computer program by the second computing system.

27. The method of claim 26, in which modifying the specification for the data processing component includes changing a value or expression for each of one or more parameters of the data processing component.

28. A computer system for updating a computer program, the computer system including one or more processors coupled to a memory, the one or more processors and memory configured to perform operations including:
  reading, from a data storage device, a computer program configured to be hosted on and executed by a first computing system, in which the computer program is configured to, when executed, receive data records from a data source, process data contained in fields of the data records, and output data records containing the processed data to a data target;

storing, to a data storage device, a characterization of a lineage, an architecture, and an operation of the computer program obtained by analyzing, by one or more processors, the read computer program, in which:

the lineage of the computer program includes static or runtime relationships among elements of the computer program, static or runtime relationships among the computer program and other computer programs, or both, the architecture of the computer program includes a characteristic of the data source, a characteristic of the data target, and a characteristic of one or more processors configured to process the data contained in the data records, and the operation of a computer program includes processes of the computer program that are executed to process the data from the data records;

reading, from a data storage device, a characterization of an update to be made to the computer program, in which when the computer program is modified according to the update, at least a portion of the modified computer program is configured to be hosted on and executed by a second computing system, the characterization of the update including an indication to anonymize personally identifiable information (PII) in data to be stored on or processed by the second computing system;

storing, to a data storage device, the modified computer program, wherein the modified computer program is generated by modifying the computer program to implement the update to generate the modified computer program, including modifying one or more of the lineage of the computer program, the architecture of the computer program, or the operation of the computer program;

migrating the portion of the modified computer program to the second computing system; and executing the modified computer program, including executing the portion of the modified computer program by the second computing system.

29. A non-transitory computer readable storage medium storing instructions for causing a computing system to perform operations for updating a computer program, the operations including:

reading, from a data storage device, a computer program configured to be hosted on and executed by a first computing system, in which the computer program is configured to, when executed, receive data records from a data source, process data contained in fields of the data records, and output data records containing the processed data to a data target;

storing, to a data storage device, a characterization of a lineage, an architecture, and an operation of the computer program obtained by analyzing, by one or more processors, the read computer program, in which:

the lineage of the computer program includes static or runtime relationships among elements of the computer program, static or runtime relationships among the computer program and other computer programs, or both, the architecture of the computer program includes a characteristic of the data source, a characteristic of the data target, and a characteristic of one or more processors configured to process the data contained in the data records, and the operation of the computer program includes processes of the computer program that are executed to process the data from the data records;

reading, from a data storage device, a characterization of an update to be made to the computer program, in which when the computer program is modified according to the update, at least a portion of the modified computer program is configured to be hosted on and executed by a second computing system, the characterization of the update including an indication to anonymize personally identifiable information (PII) in data to be stored on or processed by the second computing system;

storing, to a data storage device, the modified computer program, wherein the modified computer program is generated by modifying the computer program to implement the update to generate the modified computer program, including modifying one or more of the lineage of the computer program, the architecture of the computer program, or the operation of the computer program;

migrating the portion of the modified computer program to the second computing system; and executing the modified computer program, including executing the portion of the modified computer program by the second computing system.

30. A non-transitory computer readable storage medium storing instructions for causing a computing system to perform operations for updating a computer program, the operations including:

reading, from a data storage device, a computer program configured to be hosted on and executed by a first computing system, in which the computer program is configured to, when executed, receive data records from a data source, process data contained in fields of the data records, and output data records containing the processed data to a data target;

storing, to a data storage device, a characterization of a lineage, an architecture, and an operation of the computer program obtained by analyzing, by one or more processors, the read computer program, in which:

the lineage of the computer program includes static or runtime relationships among elements of the computer program, static or runtime relationships among the computer program and other computer programs, or both, the architecture of the computer program includes a characteristic of the data source, a characteristic of the data target, and a characteristic of one or more processors configured to process the data contained in the data records, and the operation of the computer program includes processes of the computer program that are executed to process the data from the data records;

reading, from a data storage device, a characterization of an update to be made to the computer program, in which when the computer program is modified according to the update, at least a portion of the modified computer program is configured to be hosted on and executed by a second computing system, in which the characterization of the update includes a characterization of a distributed processing scheme for at least a portion of the computer program, and in which modifying the computer program includes modifying a layout of the computer program to implement a distribution of processing operations according to the distributed processing scheme;

storing, to a data storage device, the modified computer program, wherein the modified computer program is generated by modifying the computer program to implement the update to generate the modified computer program, including modifying one or more of the lineage of the computer program, the architecture of the computer program, or the operation of the computer program;

migrating the portion of the modified computer program to the second computing system; and executing the modified computer program, including executing the portion of the modified computer program by the second computing system.

31. A non-transitory computer readable storage medium storing instructions for causing a computing system to perform operations for updating a computer program, the operations including:

reading, from a data storage device, a computer program configured to be hosted on and executed by a first computing system, in which the computer program is configured to, when executed, receive data records from a data source, process data contained in fields of the data records, and output data records containing the processed data to a data target;

storing, to a data storage device, a characterization of a lineage, an architecture, and an operation of the computer program obtained by analyzing, by one or more processors, the read computer program, in which:

the lineage of the computer program includes static or runtime relationships among elements of the computer program, static or runtime relationships among the computer program and other computer programs, or both, the architecture of the computer program includes a characteristic of the data source, a characteristic of the data target, and a characteristic of one or more processors configured to process the data contained in the data records, and the operation of the computer program includes processes of the computer program that are executed to process the data from the data records;

reading, from a data storage device, a characterization of an update to be made to the computer program, in which when the computer program is modified according to the update, at least a portion of the modified computer program is configured to be hosted on and executed by a second computing system;

storing, to a data storage device, the modified computer program, wherein the modified computer program is generated by modifying the computer program to implement the update to generate the modified computer program, including modifying one or more of the lineage of the computer program, the architecture of the computer program, or the operation of the computer program, in which modifying the computer program includes:

identifying a data processing component of the computer program that implements a first type of file transfer protocol; and modifying a specification for the data processing component according to a second type of file transfer protocol, in which the characterization of the update includes an indication of a change from the first type of file transfer protocol to the second type of file transfer protocol;

migrating the portion of the modified computer program to the second computing system; and executing the modified computer program, including executing the portion of the modified computer program by the second computing system.

\* \* \* \* \*